United States Patent
Katoh et al.

(10) Patent No.: US 10,703,973 B2
(45) Date of Patent: Jul. 7, 2020

(54) POLYMERIZABLE COMPOSITION, FILM, AND HALF MIRROR FOR DISPLAYING PROJECTION IMAGE

(71) Applicant: FUJIFILM Corporation, Tokyo (JP)

(72) Inventors: Shunya Katoh, Ashigarakami-gun (JP); Shinnosuke Sakai, Ashigarakami-gun (JP); Yuki Saiki, Ashigarakami-gun (JP); Akihiro Anzai, Ashigarakami-gun (JP)

(73) Assignee: FUJIFILM Corporation, Tokyo (JP)

( * ) Notice: Subject to any disclaimer, the term of this patent is extended or adjusted under 35 U.S.C. 154(b) by 128 days.

(21) Appl. No.: 15/685,530

(22) Filed: Aug. 24, 2017

(65) Prior Publication Data
US 2017/0349828 A1    Dec. 7, 2017

Related U.S. Application Data

(63) Continuation of application No. PCT/JP2016/057696, filed on Mar. 11, 2016.

(30) Foreign Application Priority Data

Mar. 12, 2015 (JP) ................................. 2015-049450

(51) Int. Cl.
| | | |
|---|---|---|
| *G02F 1/1333* | (2006.01) | |
| *C09K 19/20* | (2006.01) | |
| *B32B 7/02* | (2019.01) | |
| *B32B 27/00* | (2006.01) | |
| *C08F 2/50* | (2006.01) | |
| *G02B 5/08* | (2006.01) | |
| *G02B 5/26* | (2006.01) | |
| *C09K 19/34* | (2006.01) | |
| *C08F 228/00* | (2006.01) | |
| *C08F 222/30* | (2006.01) | |
| *C09K 19/30* | (2006.01) | |
| *C09K 19/38* | (2006.01) | |
| *G02B 5/30* | (2006.01) | |
| *C08F 220/30* | (2006.01) | |
| *C08F 222/10* | (2006.01) | |

(52) U.S. Cl.
CPC ............... *C09K 19/20* (2013.01); *B32B 7/02* (2013.01); *B32B 27/00* (2013.01); *C08F 2/50* (2013.01); *C08F 222/30* (2013.01); *C08F 228/00* (2013.01); *C09K 19/3068* (2013.01); *C09K 19/3491* (2013.01); *C09K 19/3497* (2013.01); *C09K 19/3809* (2013.01); *G02B 5/08* (2013.01); *G02B 5/26* (2013.01); *G02B 5/30* (2013.01); *C08F 220/302* (2020.02); *C08F 222/102* (2020.02); *C09K 2019/3075* (2013.01); *G02B 5/3016* (2013.01)

(58) Field of Classification Search
CPC ............ C09K 19/20; C09K 19/3809; C09K 19/3068; C09K 19/3491; C09K 19/3497; C09K 2019/3075; G02B 5/08; G02B 5/26; G02B 5/30; G02B 5/3016; G02F 1/1333; B32B 7/02; B32B 27/00; C08F 2/50; C08F 222/30; C08F 228/00; C08F 2220/302; C08F 2222/1013
USPC ...................................................... 252/299.01
See application file for complete search history.

(56) References Cited

U.S. PATENT DOCUMENTS

| 6,338,902 B1 | 1/2002 | Hsu et al. |
| 6,395,351 B1 | 5/2002 | Benecke et al. |

(Continued)

FOREIGN PATENT DOCUMENTS

| CN | 1257473 A | 6/2000 |
| CN | 101870651 A | 10/2010 |

(Continued)

OTHER PUBLICATIONS

Notification of Reasons for Refusal dated Sep. 4, 2018 from the Japanese Patent Office in Japanese application No. 2014-214404.
Decision of Refusal dated Sep. 4, 2018 from the Japanese Patent Office in Japanese application No. 2014-213749.
Office Action dated Sep. 10, 2018 from the United States Patent and Trademark Office in U.S. Appl. No. 15/448,975.

(Continued)

*Primary Examiner* — Geraldina Visconti
(74) *Attorney, Agent, or Firm* — Sughrue Mion, PLLC

(57) ABSTRACT

The present invention provides a polymerizable composition containing a polymerizable liquid crystal compound represented by Formula (I) and an oxime compound,

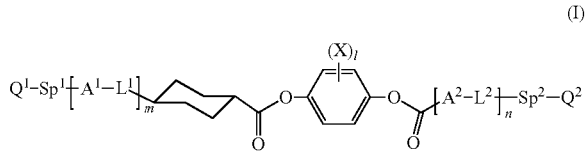

(I)

in the formula, $A^1$ and $A^2$ each represent a phenylene group or a trans-1,4-cyclohexylene group, $L^1$ and $L^2$ each represent single bond, —C(=O)O—, or —OC(=O)—, $Q^1$ and $Q^2$ each represent a polymerizable group or the like, m and n represent an integer of 0 to 2, X may represent —$X^3$-$Sp^3$-$Q^3$ or two X's may be bonded to each other to form a fused ring, $X^3$ represents —C(=O)O—, $Sp^1$, $Sp^2$, and $Sp^3$ each represent single bond, an alkylene group, or the like, $Q^3$ represents hydrogen atom, a cycloalkyl group, a polymerizable group, or the like, and l represents an integer of 0 to 4. The polymerizable composition hardly causes yellowing after curing and is useful for manufacturing a film and a half mirror for displaying a projection image.

20 Claims, 1 Drawing Sheet

(56) References Cited

U.S. PATENT DOCUMENTS

| | | | |
|---|---|---|---|
| 6,771,340 | B1 | 8/2004 | Yoshimi et al. |
| 6,791,645 | B2 | 9/2004 | Yano et al. |
| 7,927,671 | B2 | 4/2011 | Kato |
| 8,425,988 | B2 | 4/2013 | Hirai et al. |
| 8,771,810 | B2 | 7/2014 | Mizumura et al. |
| 9,505,980 | B2 * | 11/2016 | Hirai .............. C09K 19/32 |
| 9,678,384 | B2 | 6/2017 | Ibaraki |
| 10,012,868 | B2 * | 7/2018 | Nakazawa ......... C09K 19/3068 |
| 2002/0039159 | A1 | 4/2002 | Yano et al. |
| 2003/0178609 | A1 | 9/2003 | Hammond-Smith et al. |
| 2003/0224175 | A1 | 12/2003 | Morita et al. |
| 2005/0007541 | A1 | 1/2005 | Sasada et al. |
| 2009/0087590 | A1 | 4/2009 | Aiki et al. |
| 2009/0286005 | A1 | 11/2009 | Oki et al. |
| 2011/0001088 | A1 | 1/2011 | Ootsuki et al. |
| 2013/0109825 | A1 | 5/2013 | Mizumura et al. |
| 2015/0175564 | A1 | 1/2015 | Sakamoto et al. |
| 2015/0344782 | A1 | 12/2015 | Matsuyama et al. |
| 2016/0068756 | A1 * | 3/2016 | Moriya ............ C09K 19/3494 428/1.31 |
| 2016/0318845 | A1 | 11/2016 | Katoh et al. |
| 2017/0009138 | A1 | 1/2017 | Nakazawa et al. |
| 2017/0174991 | A1 | 6/2017 | Katoh et al. |
| 2017/0190821 | A1 | 7/2017 | Katoh et al. |
| 2017/0242175 | A1 | 8/2017 | Ibaraki |
| 2017/0349828 | A1 | 12/2017 | Katoh et al. |

FOREIGN PATENT DOCUMENTS

| | | | |
|---|---|---|---|
| JP | 2001-42127 A | | 2/2001 |
| JP | 2001-527570 A | | 12/2001 |
| JP | 2002-107541 A | | 4/2002 |
| JP | 2003-315553 A | | 11/2003 |
| JP | 2004-262884 A | | 9/2004 |
| JP | 2005-99236 A | | 4/2005 |
| JP | 2006-96877 A | | 4/2006 |
| JP | 2009-98596 A | | 5/2009 |
| JP | 2009-244433 A | | 10/2009 |
| JP | 2010-024438 A | | 2/2010 |
| JP | 2010-270108 A | | 12/2010 |
| JP | 2011-8207 | * | 1/2011 .............. C09K 19/54 |
| JP | 2011-237513 A | | 11/2011 |
| JP | 2013-216591 A | | 10/2013 |
| JP | 2016-53149 A | | 4/2016 |
| JP | 6080884 B2 | | 2/2017 |
| WO | 2011/155623 | * | 12/2011 ......... C09K 19/3068 |
| WO | 2011/162291 A1 | | 12/2011 |
| WO | 2014/010325 A1 | | 1/2014 |
| WO | 2014/142026 A1 | | 9/2014 |
| WO | 2015/115390 A1 | | 8/2015 |
| WO | 2015/147243 A1 | | 10/2015 |
| WO | 2016/047648 A1 | | 3/2016 |
| WO | 2017/007007 A1 | | 1/2017 |

OTHER PUBLICATIONS

Office Action dated Sep. 5, 2018 from the State Intellectual Property Office of the P.R.C. in Chinese Application No. 201580049139.8, which corresponds to co-pending U.S. Appl. No. 15/465,829.
Non-Final Office Action dated Oct. 9, 2018 from the U.S. Patent and Trademark Office in co-pending U.S. Appl. No. 15/590,401.
Office Action dated Jun. 26, 2018 from the State Intellectual Property Office of the P.R.C. in Chinese application No. 201580045362.5.
International Search Report dated Nov. 24, 2015, issued by the International Searching Authority in Application No. PCT/JP2015/075153.
Written Opinion dated Nov. 24, 2015, issued by the International Searching Authority in Application No. PCT/JP2015/075153.
International Preliminary Report on Patentability dated Mar. 16, 2017, issued by the International Searching Authority in Application No. PCT/JP2015/075153.
International Preliminary Report on Patentability dated Oct. 13, 2016, issued by the International Searching Authority in Application No. PCT/JP2015/059559.
International Search Report dated Jun. 30, 2015, issued by the International Searching Authority in Application No. PCT/JP2015/059559.
Written Opinion dated Jun. 30, 2015, issued by the International Searching Authority in Application No. PCT/JP2015/059559.
International Preliminary Report on Patentability dated Apr. 6, 2017, issued by the International Searching Authority in Application No. PCT/JP2015/076836.
International Search Report dated Nov. 2, 2015, issued by the International Searching Authority in Application No. PCT/JP2015/076836.
Written Opinion dated Nov. 2, 2015, issued by the International Searching Authority in Application No. PCT/JP2015/076836.
Partial Supplemental European Search Report dated Aug. 10, 2017 from the European Patent Office in EP Application No. 15837387.8.
Extended European Search Report dated Aug. 2, 2017 from the European Patent Office in EP Application No. 15844672.4.
Extended European Search Report dated Dec. 1, 2017 from the European Patent Office in EP Application No. 15837387.8.
Office Action dated Oct. 31, 2017 from the Japanese Patent Office in JP Application No. 2016-546701.
Office Action dated Nov. 21, 2017 from the Japanese Patent Office in JP Application No. 2014-213749.
Office Action dated Nov. 21, 2017 from the Japanese Patent Office in JP Application No. 2014-214404.
Office Action dated Mar. 6, 2018 from the Japanese Patent Office in JP Application No. 2016-546701.
Office Action dated Aug. 10, 2017 from U.S. Patent & Trademark Office in U.S. Appl. No. 15/273,784.
Notice of Allowance dated Mar. 1, 2018 from U.S. Patent & Trademark Office in U.S. Appl. No. 15/273,784.
Notice of Allowability dated May 10, 2018 from U.S. Patent & Trademark Office in U.S. Appl. No. 15/273,784.
Office Action dated Mar. 26, 2018 from U.S. Patent & Trademark Office in U.S. Appl. No. 15/448,975.
Office Action dated Sep. 13, 2016 from U.S. Patent & Trademark Office in U.S. Appl. No. 14/886,740.
Notice of Allowance dated Feb. 15, 2017 from U.S. Patent & Trademark Office in U.S. Appl. No. 14/886,740.
International Preliminary Report on Patentability dated Sep. 12, 2017 in counterpart International Application No. PCT/JP2016/057696.
Translation of Written Opinion dated Jun. 14, 2016 in PCT/JP2016/057696.
International Search Report dated Jun. 14, 2016 in PCT/JP2016/057696.
Office Action dated Dec. 4, 2018 from the Japanese Patent Office in counterpart JP Application No. 2017-505414.
Office Action dated Sep. 28, 2018 from the United States Patent and Trademark Office in co-pending U.S. Appl. No. 15/465,829.
Office Action dated Feb. 3, 2019 from the State Intellectual Property Office of the P.R.C. in Chinese Application No. 201580049139.8.
Office Action dated Jan. 29, 2019 from the United States Patent and Trademark Office in co-pending U.S. Appl. No. 15/590,401.
Office Action dated Feb. 15, 2019, from the State Intellectual Property Office of the P.R.C. in counterpart Chinese Application No. 201580045362.5.

* cited by examiner

POLYMERIZABLE COMPOSITION, FILM, AND HALF MIRROR FOR DISPLAYING PROJECTION IMAGE

CROSS-REFERENCE TO RELATED APPLICATIONS

This application is a continuation of PCT International Application No. PCT/JP2016/057696 filed on Mar. 11, 2016, which claims priority under 35 U.S.C § 119 (a) to Japanese Patent Application No. 2015-049450 filed on Mar. 12, 2015, the entire content of which is incorporated herein by reference.

BACKGROUND OF THE INVENTION

1. Field of the Invention

The present invention relates to a polymerizable composition. The present invention particularly relates to a polymerizable composition containing a polymerizable liquid crystal compound having a partial structure in which a cyclohexylene group and a phenylene group are ester-bonded to each other. In addition, the present invention relates to a film which is prepared using the polymerizable composition, and a half mirror for displaying a projection image which is prepared using the polymerizable composition.

2. Description of the Related Art

It is possible to prepare various optical films such as a phase difference film and a reflection film by using a polymerizable composition containing a polymerizable liquid crystal compound having liquid crystallinity. WO2014/010325A discloses that a phase difference film prepared by using a polymerizable liquid crystal compound having a partial structure in which a cyclohexylene group and a phenylene group having a substituent of a hydrazone structure are ester-bonded to each other has ideal wavelength dispersibility exhibiting broadband performance.

SUMMARY OF THE INVENTION

As disclosed in WO2014/010325A, a polymerizable liquid crystal compound having a partial structure in which a cyclohexylene group and a phenylene group are ester-bonded to each other is useful for preparation of a phase difference film. In addition, from the studies of the present inventors, it has been found that a polymerizable liquid crystal compound having a cyclohexylene group and a phenylene group has low birefringence, and it has been also found that a reflection film with a narrowband can be provided by forming a cholesteric liquid crystalline phase. However, in the case where a cured film is prepared by using a polymerizable composition containing the polymerizable liquid crystal compound in the process of the investigations of the present inventors, a problem of yellowing arises in a moisture resistance test. The degree of yellowing particularly remarkably varies depending on the substituent of the phenylene group in the polymerizable liquid crystal compound.

Considering the above circumstances, an object of the present invention is to provide a polymerizable composition which hardly causes yellowing after curing as a polymerizable composition containing a polymerizable liquid crystal compound having a partial structure in which a cyclohexylene group and a phenylene group are ester-bonded to each other. Another object of the present invention is to provide a film which hardly causes yellowing and a half mirror for displaying a projection image.

The present inventors have conducted various investigations to achieve the above objects and have found that the above yellowing hardly occurs by using an oxime compound as a polymerization initiator to be used in combination with a polymerizable liquid crystal compound. Then, the present inventors have further conducted investigations on the basis of the findings and thus have completed the present invention.

That is, the present invention provides <1> to <17> described below.

<1> A polymerizable composition, comprising: a polymerizable liquid crystal compound represented by Formula (I); and an oxime compound,

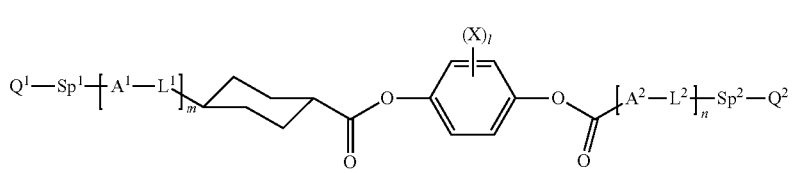

(I)

in the formula, $A^1$ and $A^2$ each independently represent a phenylene group which may have a substituent or a trans-1,4-cyclohexylene group which may have a substituent, $L^1$ and $L^2$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $Sp^1$ and $Sp^2$ each independently represent a single bond or a linking group selected from the group consisting of a linear alkylene group or a branched alkylene group having 1 to 20 carbon atoms, and a group in which one or two or more —CH$_2$—'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, $Q^1$ and $Q^2$ each independently represent a hydrogen atom or a polymerizable group selected from the group consisting of groups represented by Formula Q-1 to Formula Q-5 and any one of $Q^1$ and $Q^2$ represents a polymerizable group,

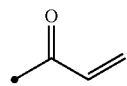

Q-1

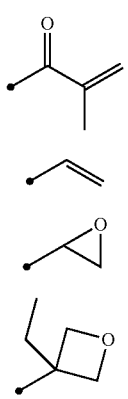

m and n each independently represent an integer of 0 to 2, when m represents 2, two $A^1$'s may be identical to each other or different from each other, and two $L^1$'s may be identical to each other or different from each other, and when n represents 2, two $A^2$'s may be identical to each other or different from each other, and two $L^2$'s may be identical to each other or different from each other, X may represent a group represented by —$X^3$-$Sp^3$-$Q^3$ or two X's may be bonded to each other to form a fused ring with a benzene ring of a phenylene group to which two X's are bonded, $X^3$ represents a single bond, or a linking group selected from the group consisting of —O—, —C(=O), and —C(=O)O—, $Sp^3$ represents a single bond or a linking group selected from the group consisting of a linear alkylene group or a branched alkylene group having 1 to 20 carbon atoms, and a group in which one or two or more —$CH_2$—'s in the linear alkylene group or the branched alkylene group having 1 to 20 carbon atoms are substituted with —O—, —S—, —NH—, —N($CH_3$)—, —C(=O)—, —OC(=O)—, or —C(=O)O—, $Q^3$ represents a hydrogen atom or any polymerizable group selected from the group consisting of a cycloalkyl group, a group in which one or two or more —$CH_2$—'s in the cycloalkyl group are substituted with —O—, —S—, —NH—, —N($CH_3$)—, —C(=O)—, —OC(=O)—, or —C(=O)O—, and groups represented by Formula Q-1 to Formula Q-5, and

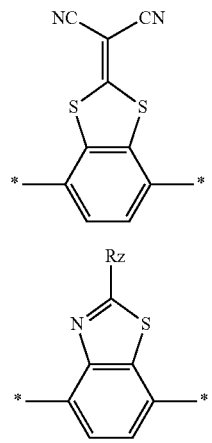

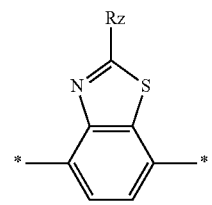

in Formula (IV) and Formula (V), * represents a bonding position with the remaining portion of the compound represented by Formula (I), and in Formula (V), Rz represents an alkyl group, an aryl group which may have a substituent, or a heteroaryl group which may have a substituent.

<3> The polymerizable composition according to <1>, in which the polymerizable liquid crystal compound is a polymerizable liquid crystal compound in which in Formula (I), X represents a group represented by —$X^3$-$Sp^3$-$Q^3$, $X^3$ represents —C(=O)O—, and l represents 1.

<4> The polymerizable composition according to any one of <1> to <3>, in which the polymerizable liquid crystal compound is a polymerizable liquid crystal compound in which in Formula (I), $A^1$ and $A^2$ each independently represent a 1,4-phenylene group which may have a substituent, m represents 1 or 2, and n represents 0 or 1.

<5> The polymerizable composition according to any one of <1> to <4>, in which the polymerizable liquid crystal compound is a polymerizable liquid crystal compound in which in Formula (I), both $A^1$ and $A^2$ represent an unsubstituted trans-1,4-cyclohexylene group, m represents 0 or 1, and n represents 1 or 2.

<6> The polymerizable composition according to any one of <1> to <5>, in which the polymerizable liquid crystal compound is a polymerizable liquid crystal compound represented by Formula (I-21),

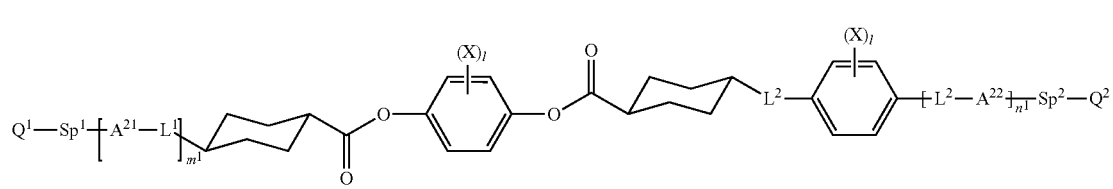

l represents an integer of 0 to 4, and when l represents 2 to 4, l X's may be identical to each other or different from each other.

<2> The polymerizable composition according to <1>, in which the polymerizable liquid crystal compound is a polymerizable liquid crystal compound in which in Formula (I), a phenylene group in which X is substituted is represented by Formula (IV) or Formula (V), in the formula, $A^{21}$ represents a 1,4-phenylene group which may have a substituent, $A^{22}$ represents an unsubstituted trans-1,4-cyclohexylene group, $m^1$ represents an integer of 0 to 1, and $n^1$ represents an integer of 0 to 1.

<7> The polymerizable composition according to any one of <1> to <6>, in which the polymerizable liquid crystal compound is a compound represented by Formula (I-12),

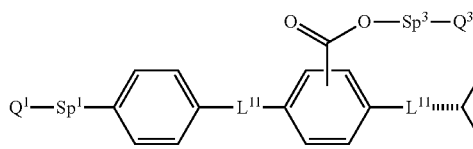
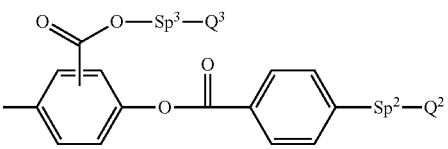

(I-12)

in the formula, $L^{11}$'s each independently represent a single bond, or a linking group selected from the group consisting of —C(=O)O—, —OC(=O)—, and —OC(=O)O—.

<8> The polymerizable composition according to any one of <1> to <7>, in which the polymerizable liquid crystal compound is a compound represented by Formula (I-22),

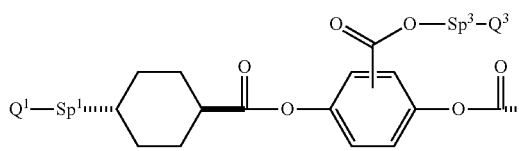
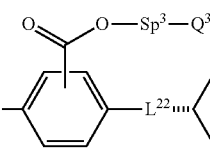

(I-22)

in the formula, $L^{22}$'s each independently represents a single bond or a linking group selected from the group consisting of —C(=O)O—, —OC(=O)—, and —OC(=O)O—.

<9> The polymerizable composition according to any one of <1> to <8>, in which the polymerizable liquid crystal compound is a polymerizable liquid crystal compound in which in Formula (I), m+n is greater than or equal to 2.

<10> The polymerizable composition according to any one of <1> to <9>, further comprising: a chiral compound.

<11> The polymerizable composition according to any one of <1> to <10>, further comprising: a cross-linking agent.

<12> A film, comprising: a layer obtained by curing the polymerizable composition according to any one of <1> to <11>.

<13> A film, comprising: two or more layers obtained by curing the polymerizable composition according to any one of <1> to <11>.

<14> The film according to <12> or <13>, in which the film reflects visible light.

<15> A film, comprising: at least three layers formed of the polymerizable composition according to any one of <1> to <11>,
in which the three layers are a layer formed by immobilizing a cholesteric liquid crystalline phase having a center wavelength of selective reflection in a red light wavelength range, a layer formed by immobilizing a cholesteric liquid crystalline phase having a center wavelength of selective reflection in a green light wavelength range, and a layer formed by immobilizing a cholesteric liquid crystalline phase having a center wavelength of selective reflection in a blue light wavelength range.

<16> A half mirror for displaying a projection image, comprising: the film according to <15>.

<17> The half mirror for displaying a projection image according to <16>, further comprising: a base material which is inorganic glass or an acrylic resin.

According to the present invention, a polymerizable composition which hardly causes yellowing after curing is provided as a polymerizable composition containing a polymerizable liquid crystal compound having a partial structure in which a cyclohexylene group and a phenylene group are ester-bonded to each other. It is possible to provide a film which hardly causes yellowing using the polymerizable composition of the present invention. In addition, it is possible to provide a half mirror for displaying a projection image which hardly causes a disturbance in a projection image.

DESCRIPTION OF THE PREFERRED EMBODIMENTS

Figure 1:
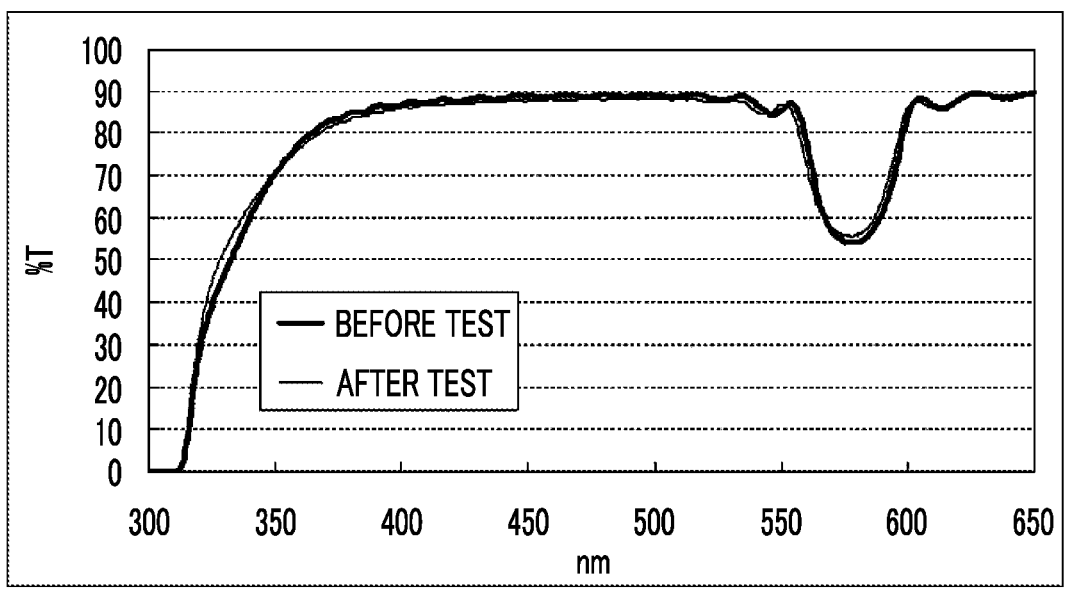
FIG. 1 is a graph showing a change in a transmission spectrum of a selective reflection film prepared in Example 2 before and after an environment test.
Figure 2:
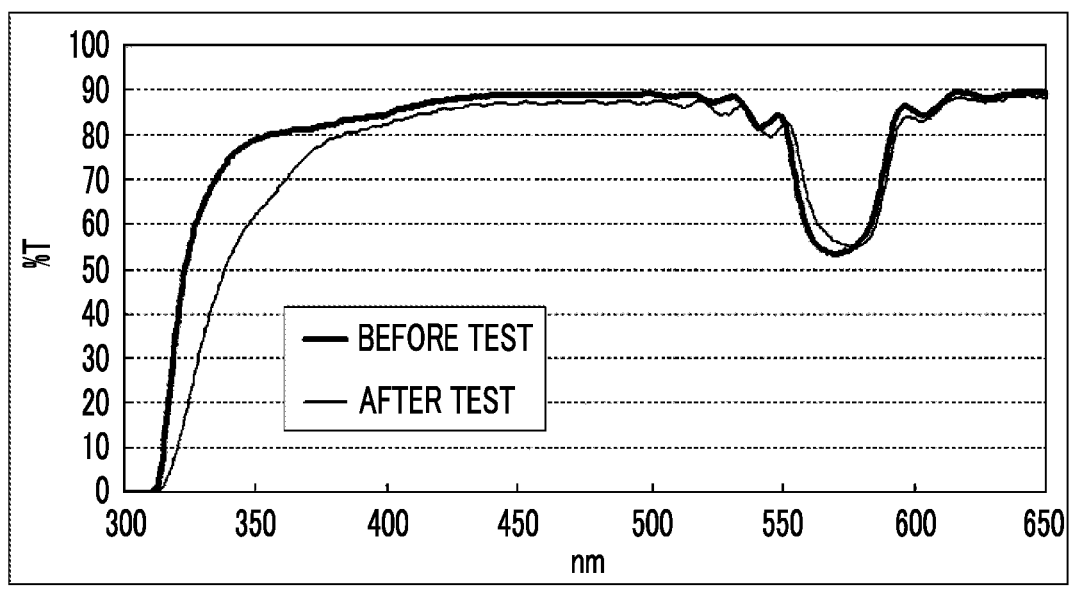
FIG. 2 is a graph showing a change in a transmission spectrum of a selective reflection film prepared in Comparative Example 2 before and after an environment test.

Hereinafter, the present invention will be described in detail. In the specification, a numerical range represented by using "to" indicates a range including the numerical values before and after "to" as the lower limit value and the upper limit value.

In the specification, "(meth)acrylate" indicates "any one or both of acrylate and methacrylate".

In the specification, a phase difference indicates in-plane retardation, and indicates in-plane retardation at a wavelength of 550 nm, unless otherwise a wavelength is stated. In the specification, the in-plane retardation is measured by using a polarization phase difference analysis device AxoScan manufactured by Axometrics, Inc. The in-plane retardation at a wavelength of λ nm can be measured by allowing light at a wavelength of λ nm to be incident in a film normal direction using KOBRA 21ADH or WR (manufactured by Oji Scientific Instruments).

<Polymerizable Composition>

A polymerizable composition of the present invention contains a polymerizable liquid crystal compound represented by Formula (I) and an oxime compound.

The polymerizable composition may contain other components such as other liquid crystal compounds, other polymerization initiators, a chiral compound, and an alignment control agent, in addition to the polymerizable liquid crystal compound and the oxime compound. Hereinafter, each component will be described.

[Polymerizable Liquid Crystal Compound]

The polymerizable liquid crystal compound contained in the polymerizable composition of the present invention is a polymerizable liquid crystal compound represented by Formula (I) having a trans-1,4-cyclohexylene group and a 1,4-phenylene group having a substituent.

In the specification, the number of carbon atoms of the cycloalkyl group is preferably 3 to 20, is more preferably greater than or equal to 5, and is preferably less than or equal to 10, is more preferably less than or equal to 8, and is even more preferably less than or equal to 6. Examples of the cycloalkyl group can include a cyclopropyl group, a cyclobutyl group, a cyclopentyl group, a cyclohexyl group, a cycloheptyl group, and a cyclooctyl group.

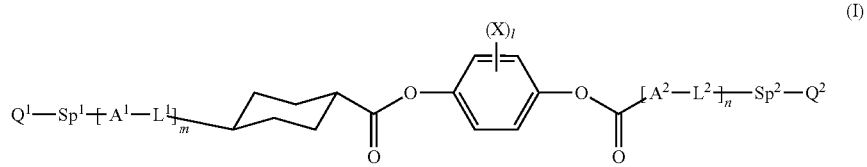

(I)

In Formula (I), $A^1$ and $A^2$ each independently represent a phenylene group which may have a substituent or a trans-1,4-cyclohexylene group which may have a substituent. It is preferable that the phenylene group which may have a substituent represented by $A^1$ or $A^2$ is a 1,4-phenylene group which may have a substituent. It is preferable that $A^1$ or $A^2$ is a 1,4-phenylene group which may have a substituent or an unsubstituted trans-1,4-cyclohexylene group.

In the specification, the substituent in the expression "which may have a substituent" is not particularly limited, and examples of the substituent include a substituent selected from the group consisting of an alkyl group, a cycloalkyl group, an alkoxy group, an alkyl ether group, an amido group, an amino group, a halogen atom, and a group configured by combining two or more substituents described above. In addition, examples of the substituent include a substituent represented by X described later. The phenylene group and the trans-1,4-cyclohexylene group may have 1 to 4 substituents. When the phenylene group and the trans-1,4-cyclohexylene group have two or more substituents, the two or more substituents may be identical to each other or different from each other.

In particular, the substituent that the phenylene group and the trans-1,4-cyclohexylene group may have is preferably a substituent selected from the group consisting of an alkyl group, an alkoxy group, and X. The number of substituents is preferably 1 or 2 and more preferably 1.

In the specification, the alkyl group means any one of a linear alkyl group and a branched alkyl group. The number of carbon atoms of the alkyl group is preferably 1 to 30, is more preferably 1 to 10, and is particularly preferably 1 to 6. Examples of the alkyl group include a methyl group, an ethyl group, an n-propyl group, an isopropyl group, an n-butyl group, an isobutyl group, a sec-butyl group, a tert-butyl group, an n-pentyl group, an isopentyl group, a neopentyl group, a 1,1-dimethyl propyl group, an n-hexyl group, an isohexyl group, a linear heptyl group or a branched heptyl group, an octyl group, a nonyl group, a decyl group, a undecyl group, and a dodecyl group. The same description with respect to the alkyl group described above applies to an alkoxy group including the alkyl group. In addition, in the specification, in the alkylene group, specific examples of the alkylene group include a divalent group or the like obtained by removing one arbitrary hydrogen atom from each of the examples of the alkyl group described above.

Examples of the halogen atom include a fluorine atom, a chlorine atom, a bromine atom, and an iodine atom.

In Formula (I), $L^1$ and $L^2$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—.

It is preferable that $L^1$ and $L^2$ are each independently a single bond, —C(=O)O—, or —OC(=O)—. m $L^1$'s may be identical to each other or different from each other. n $L^2$'s may be identical to each other or different from each other.

In the specification, the element described on the left side in the linking group ("O" in a case of "—OC(=O)—") is bonded to the element on the $Q^1$ side in General Formula (I).

$Sp^1$ and $Sp^2$ each independently represent a single bond or a linking group selected from the group consisting of a linear alkylene group or a branched alkylene group having 1 to 20 carbon atoms, and a group in which one or two or more —CH$_2$-'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—. It is preferable that $Sp^1$ and $Sp^2$ are each independently a single bond or a linking group configured by combining one or two or more groups selected from the group consisting of a linear alkylene group having 1 to 10 carbon atoms in which a linking group selected from the group consisting of —O—, —OC(=O)—, —C(=O)O—, and —OC(=O)O— is bonded to each of both terminals, —OC(=O)—, —C(=O)O—, —O—, and a linear alkylene group having 1 to 10 carbon atoms, and it is also preferable that $Sp^1$ and $Sp^2$ are each independently a linear alkylene group having 1 to 10 carbon atoms in which —O—, —OC(=O)—, or —C(=O)O— is bonded to each of both terminals or one terminal.

$Q^1$ and $Q^2$ each independently represent a hydrogen atom or a polymerizable group selected from the group consisting of groups represented by Formula Q-1 to Formula Q-5.

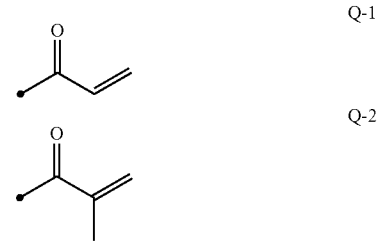

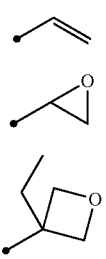

Q-3

Q-4

Q-5

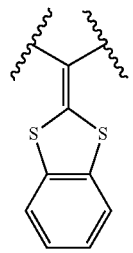 [SMILES: *C(*)=C1Sc2ccccc2S1]

Here, any one of $Q^1$ and $Q^2$ represents a polymerizable group. An acryloyl group (Formula Q-1) or a methacryloyl group (Formula Q-2) is preferable as the polymerizable group.

m represents an integer of 0 to 2 and is preferably an integer of 1 or 2. When m represents 2, two $A^1$'s may be identical to each other or different from each other and two $L^1$'s may be identical to each other or different from each other.

n represents an integer of 0 to 2 and is preferably 1. When n represents 2, two $A^2$'s may be identical to each other or different from each other, and two $L^2$'s may be identical to each other or different from each other.

m+n is preferably 2 or more and more preferably 3 or more.

X represents a group represented by —$X^3$-$Sp^3$-$Q^3$ or two X's are bonded to form a fused ring with a phenylene group to which two X's are bonded.

$X^3$ represents a single bond or a linking group selected from the group consisting of —O—, —C(=O), or —C(=O)—O—. It is preferable that $X^3$ is —C(=O)—O—.

$Sp^3$ has the same meaning as $Sp^1$ and the preferable range is also the same as the preferable range of the $Sp^1$.

$Q^3$ represents a hydrogen atom or one polymerizable group selected from the group consisting of a cycloalkyl group, a group in which one or two or more —$CH_2$—'s in the cycloalkyl group are substituted with —O—, —S—, —NH—, —N($CH_3$)—, —C(=O)—, —OC(=O)—, or —C(=O)O—, or groups represented by Formula Q-1 to Formula Q-5. Here, the polymerizable group is preferably an acryloyl group (Formula Q-1) or a methacryloyl group (Formula Q-2).

Specifically, examples of the group in which one or two or more —$CH_2$—'s in the cycloalkyl group are substituted with —O—, —S—, —NH—, —N($CH_3$)—, —C(=O)—, —OC(=O)—, or —C(=O)O— include a tetrahydrofuranyl group, a pyrrolidinyl group, an imidazolidinyl group, a pyrazolidinyl group, a piperidyl group, a piperazinyl group, a morpholinyl group, and the like. A substitution position is not particularly limited. Among them, the tetrahydrofuranyl group is preferable, and a 2-tetrahydrofuranyl group is particularly preferable.

l represents an integer of 0 to 4, and when l represents 2 to 4, l X's may be identical to each other or different from each other. l is preferably 1 or 2 and is more preferably 1.

It is preferable that X is a group selected from the group consisting of an alkyl group, an alkoxy group, an alkoxycarbonyl group which may be substituted with an alkoxy group, an acyl group which may be substituted with an alkoxy group, and a formyl group.

Examples of the fused ring formed by bonding two X's with a benzene ring of a phenylene group to which two X's are bonded include naphthalene, chroman, isochroman, indoline, isoindoline, chromene, xanthene, phenoxathiin, thianthrene, quinoline, isoquinoline, phthalazine, quinoxaline, 1,3-benzodithiol-2-ylidene, and 1,3-benzothiazol-2-yl. All examples of the fused ring may have a substituent. In particular, a fused ring having a 1,3-benzodithiol-2-ylidene skeleton shown below is preferable.

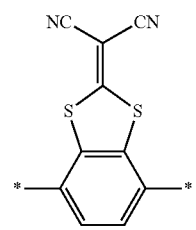

Preferable examples of the phenylene group having a substituent which forms a fused ring include a group having a structure represented by Formula (IV) or Formula (V).

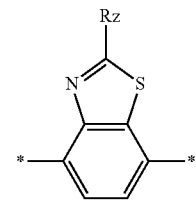

In Formula (IV) and Formula (V), * represents a bonding position with the remaining portion of the compound represented by Formula (I). In Formula (V), Rz represents an alkyl group, an aryl group which may have a substituent, or a heteroaryl group which may have a substituent. At this time, in addition to the above substituent, the substituent may be a nitro group. Examples of the aryl group include a phenyl group and a naphthyl group. Examples of the heteroaryl group include a furyl group, a thienyl group, a pyrrolyl group, a pyridyl group, and a benzofuranyl group.

Preferable examples of the polymerizable liquid crystal compound represented by Formula (I) include a polymerizable liquid crystal compound in which in Formula (I), $A^1$ and $A^2$ each independently represent a 1,4-phenylene group which may have a substituent, m is 1 or 2, and n is 0 or 1, a polymerizable liquid crystal compound in which, in Formula (I), both $A^1$ and $A^2$ represent an unsubstituted trans-1,4-cyclohexylene group, m is 0 or 1, and n is 1 or 2, and a polymerizable liquid crystal compound represented by Formula (I-21).

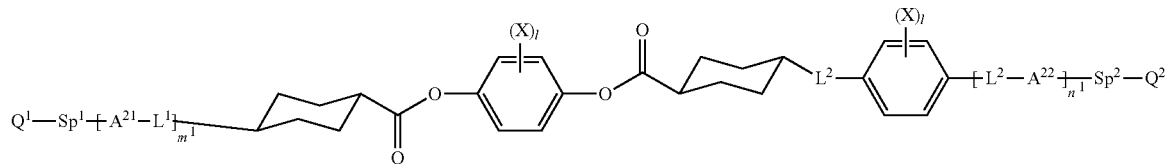
(I-21)

In Formula (I-21), the definitions of $Q^1$, $Q^2$, $Sp^1$, $Sp^2$, $L^1$, $L^2$, X, l, and m are the same as the definitions in Formula (I). $A^{21}$ represents a 1,4-phenylene group which may have a substituent, $A^{22}$ represents an unsubstituted trans-1,4-cyclohexylene group, $m^1$ represents an integer of 0 or 1, and $n^1$ represents an integer of 0 or 1.

Particularly preferable examples of the polymerizable liquid crystal compound represented by Formula (I) in which $A^1$ and $A^2$ each independently represent a 1,4-phenylene group which may have a substituent include a compound represented by Formula (I-12).

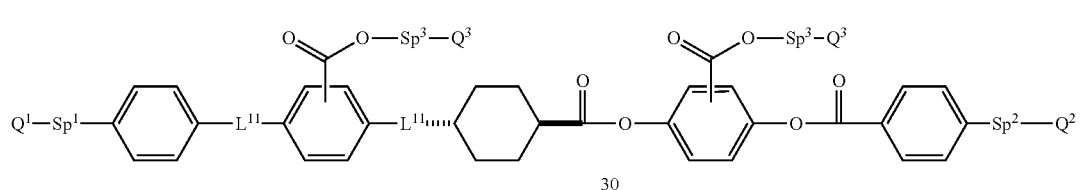
(I-12)

In Formula (I-12), the definitions of $Q^1$, $Q^2$, $Q^3$, $Sp^1$, $Sp^2$, and $Sp^3$ are the same as the definitions in Formula (I). $L^{11}$'s each independently represent a single bond or a linking group selected from the group consisting of —C(=O)O—, —OC(=O)—, and —OC(=O)O—.

Particularly preferable examples of the polymerizable liquid crystal compound represented by Formula (I-21) include a compound represented by Formula (I-22).

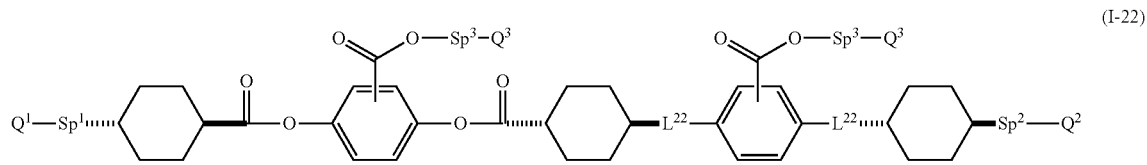
(I-22)

In Formula (I-22), the definitions of $Q^1$, $Q^2$, $Q^3$, $Sp^1$, $Sp^2$, and $Sp^3$ are the same as the definitions in Formula (I). $L^{22}$'s each independently represent a single bond or a linking group selected from the group consisting of —C(=O)O—, —OC(=O)—, and —OC(=O)O—.

Examples of the polymerizable liquid crystal compound represented by Formula (I) will be shown below but the present invention is not limited to these examples.

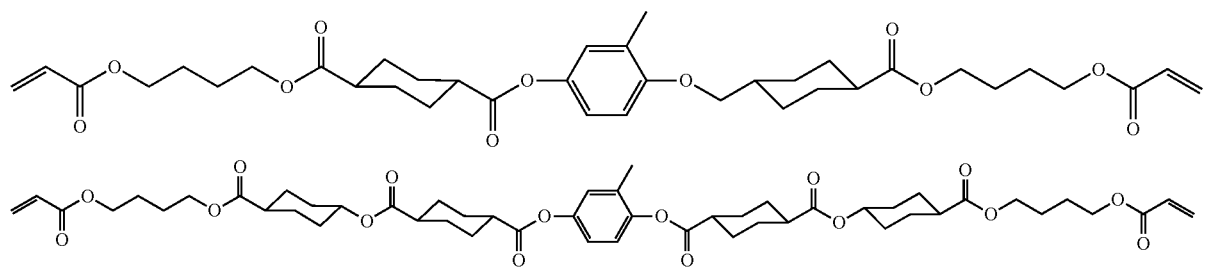

-continued
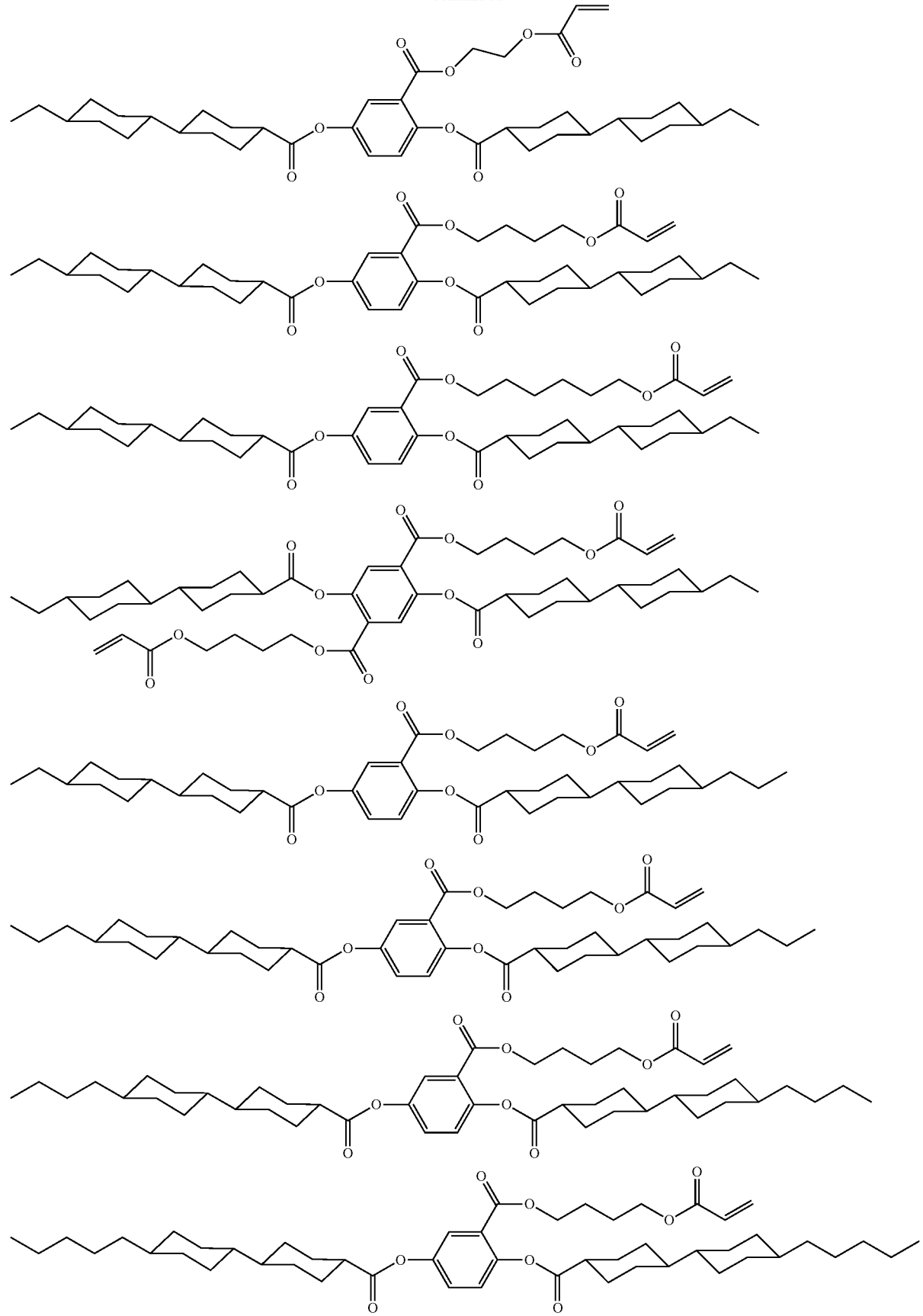

-continued
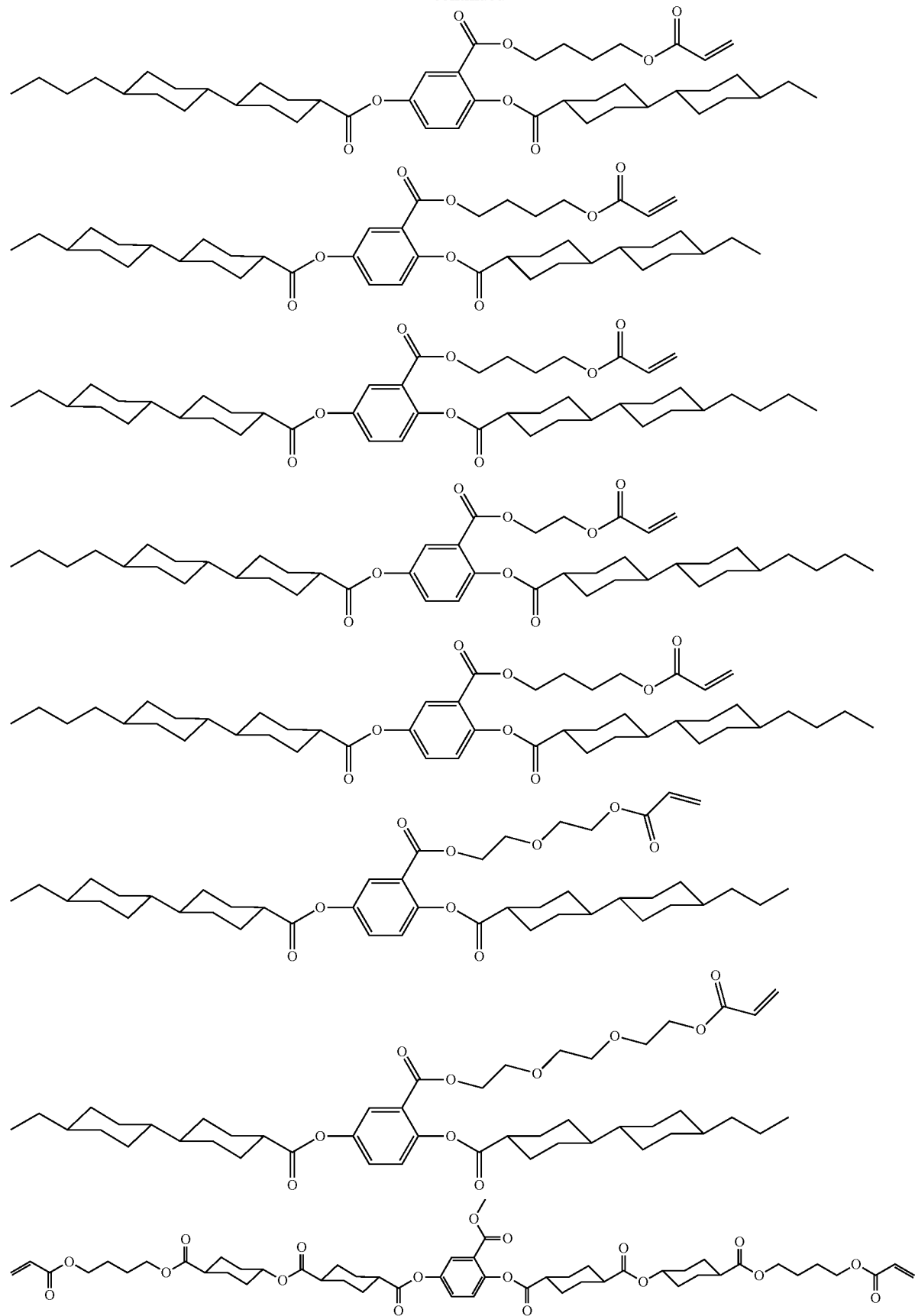

-continued
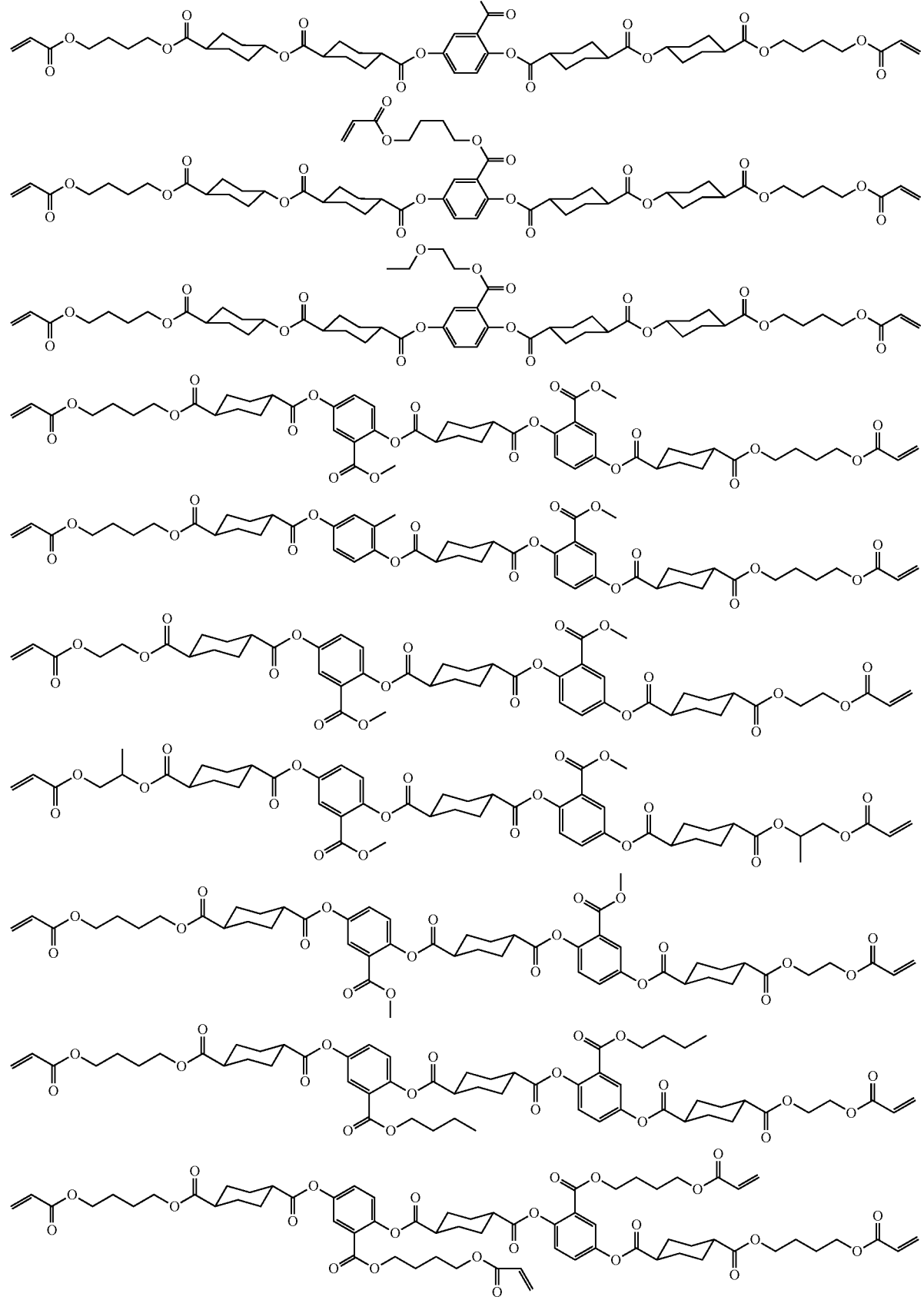

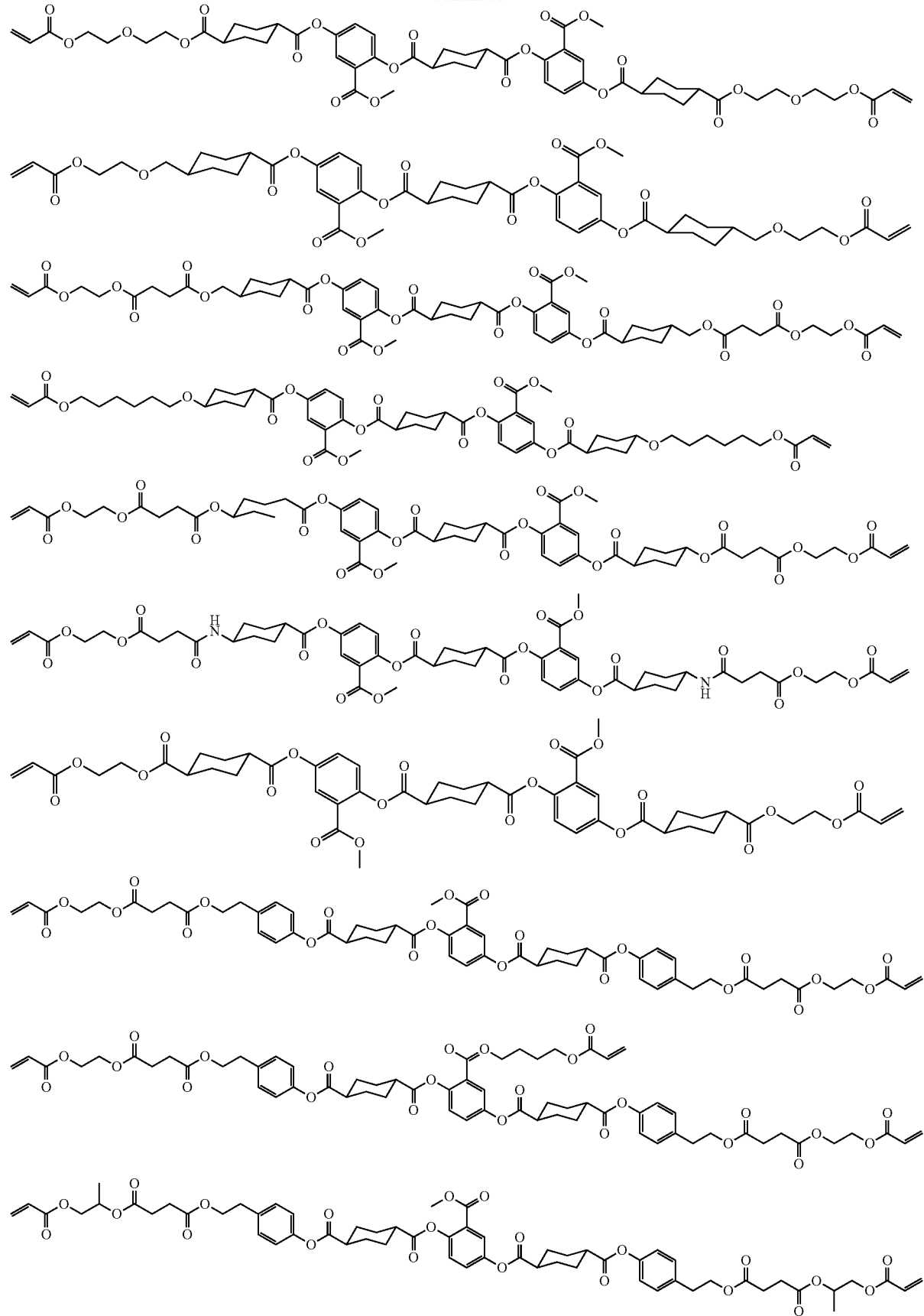

-continued
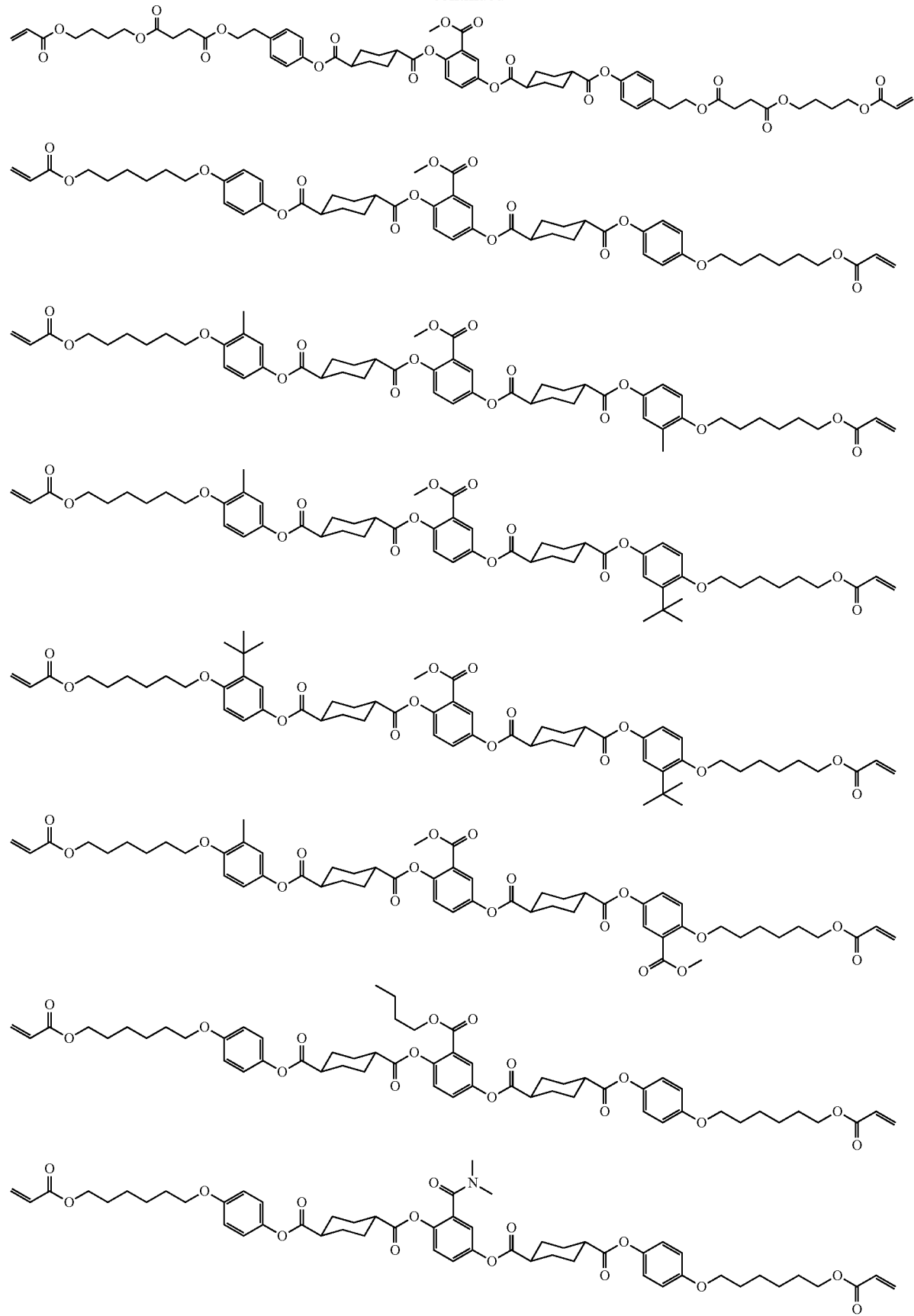

-continued
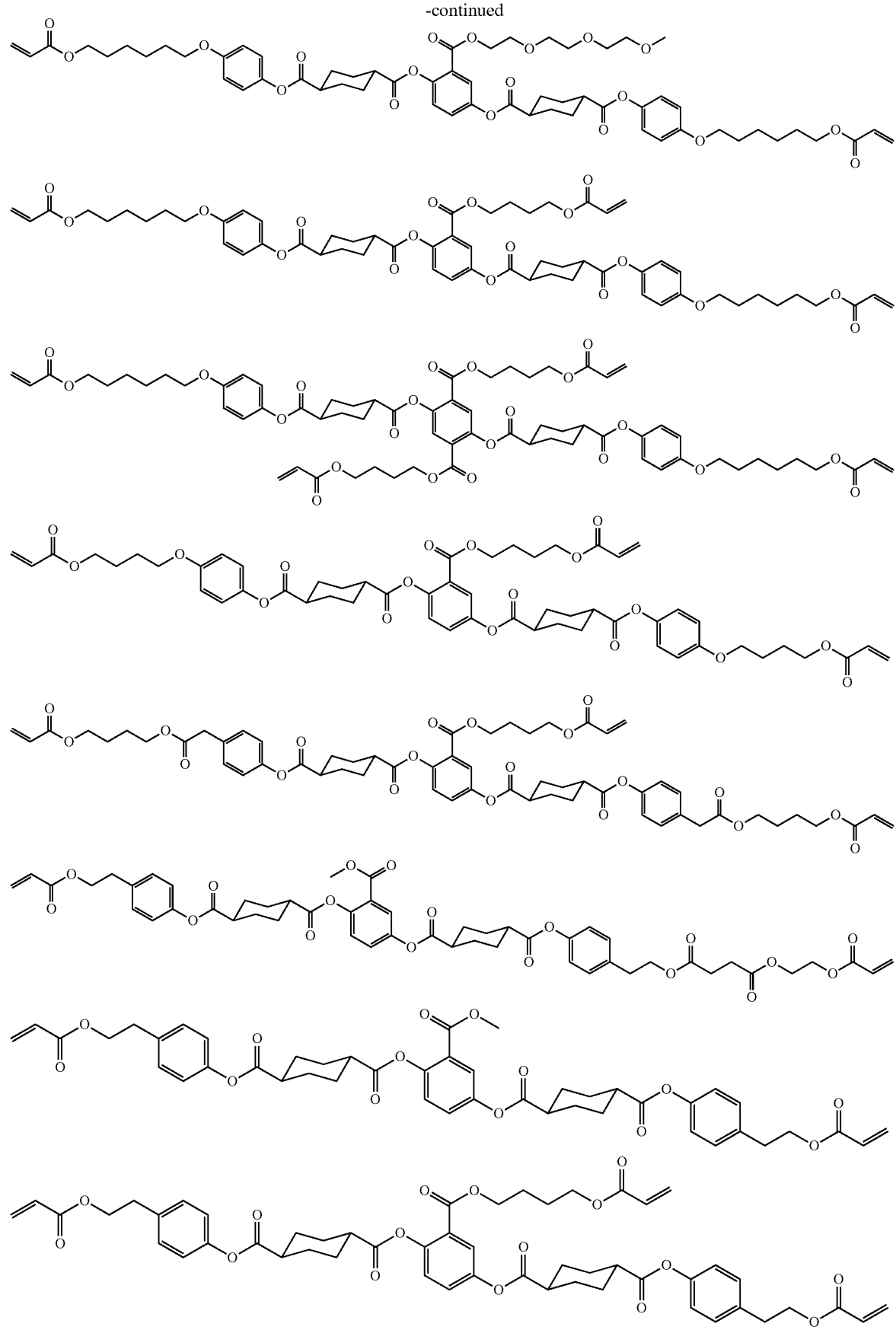

-continued
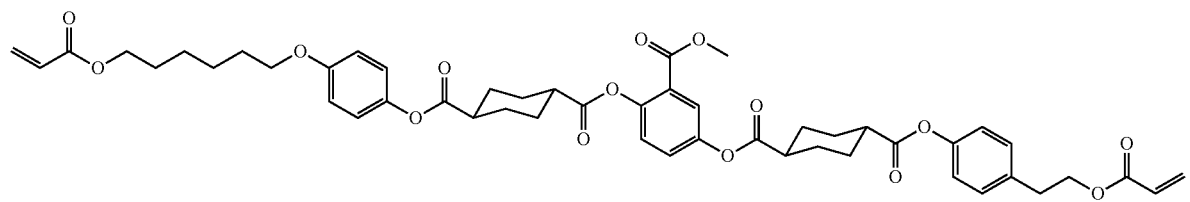
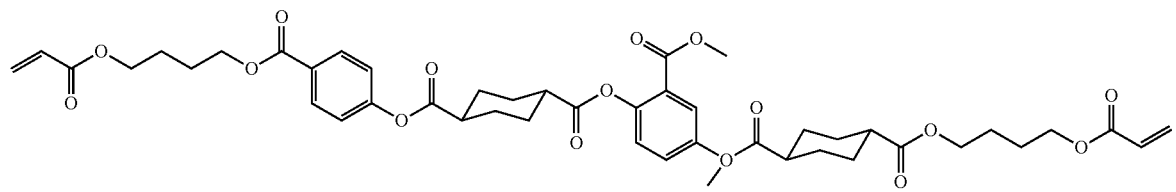
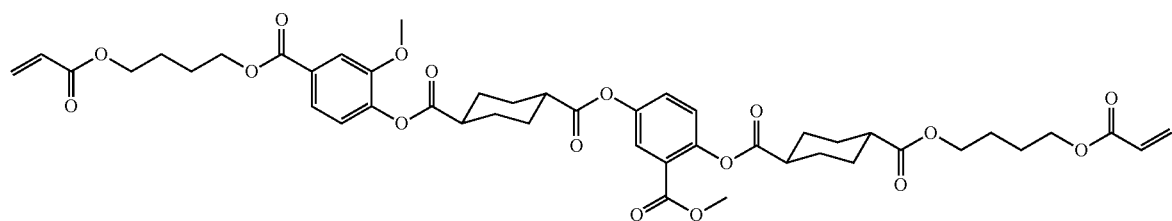
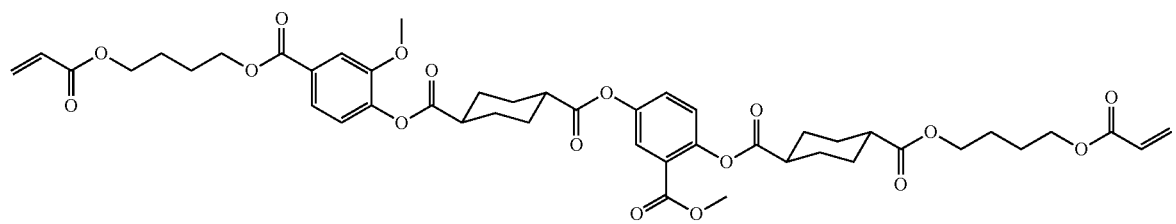
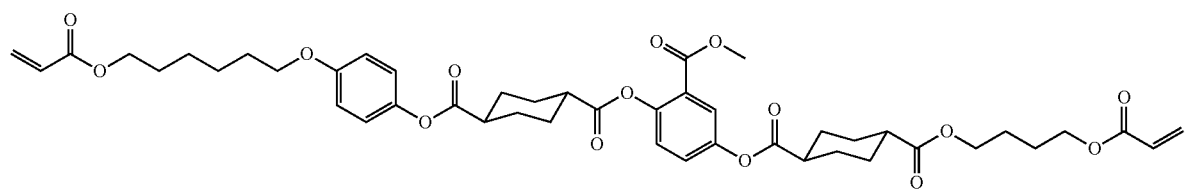
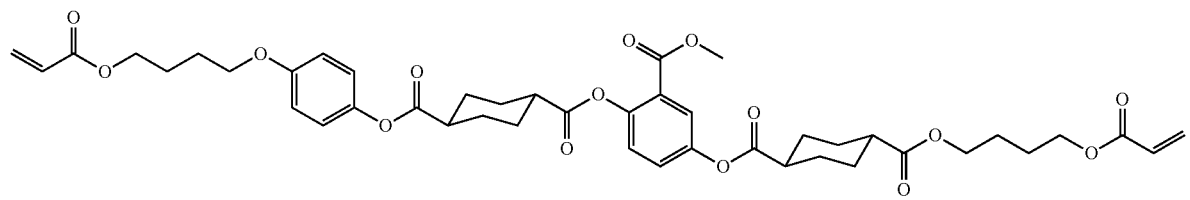
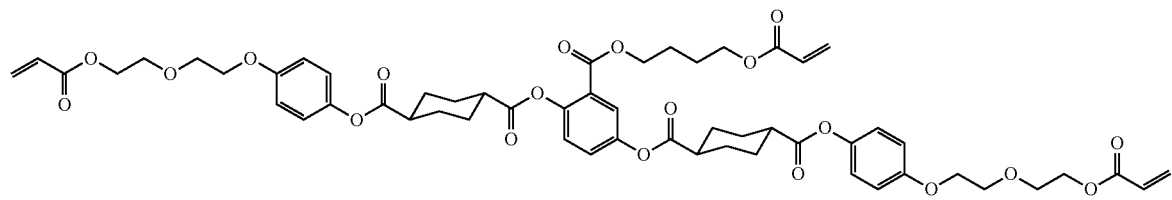
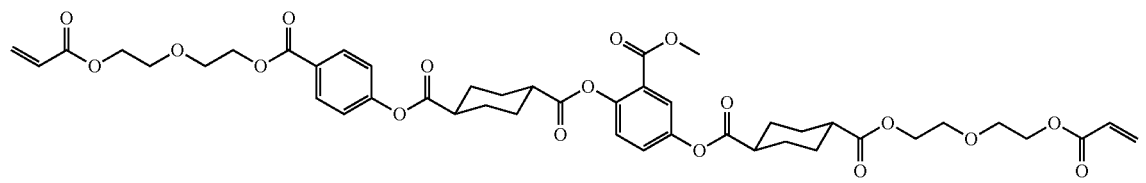

-continued
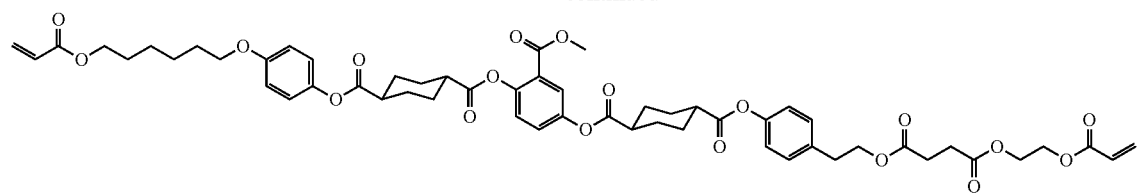
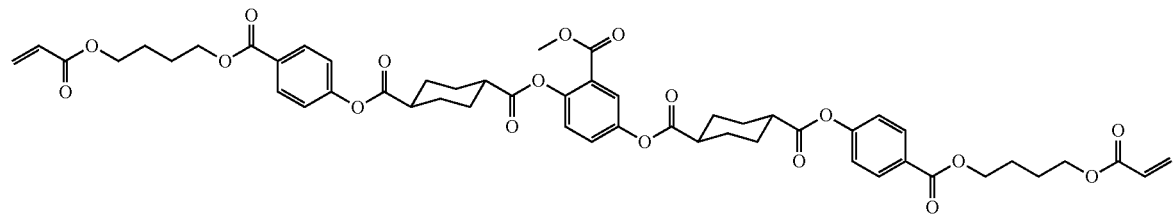
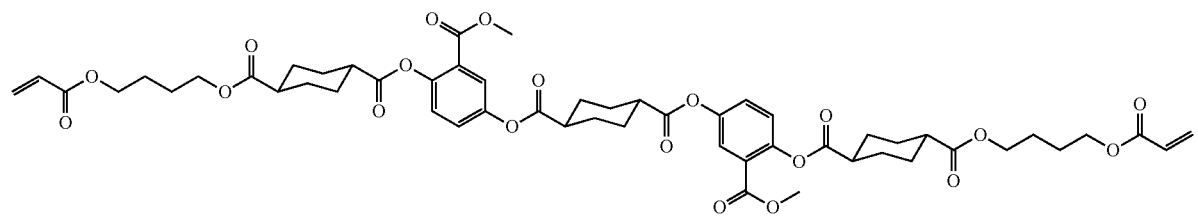
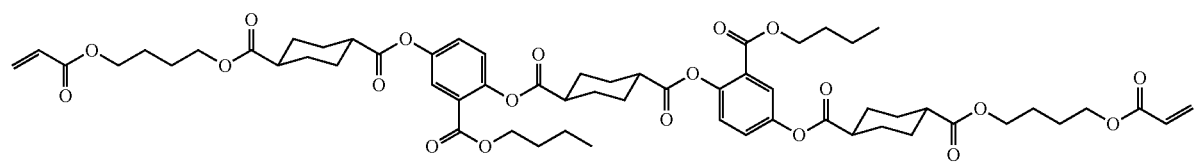
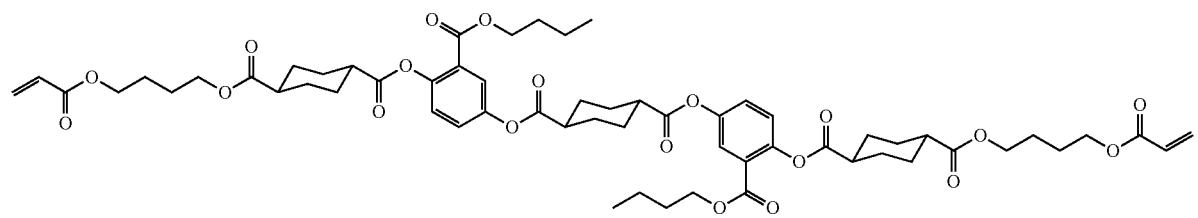
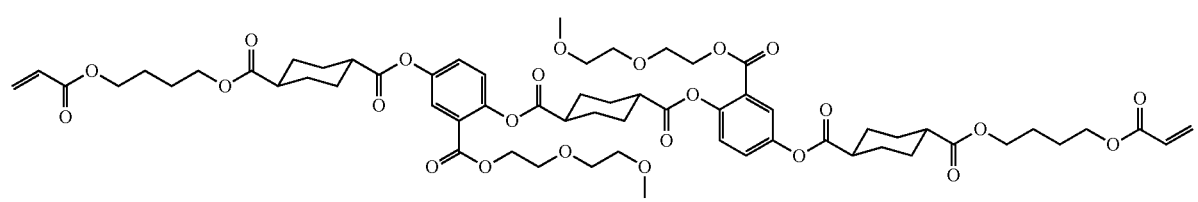
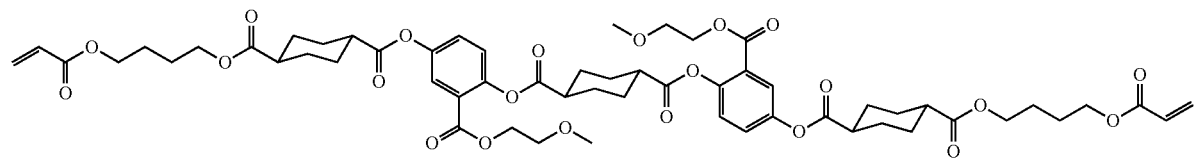
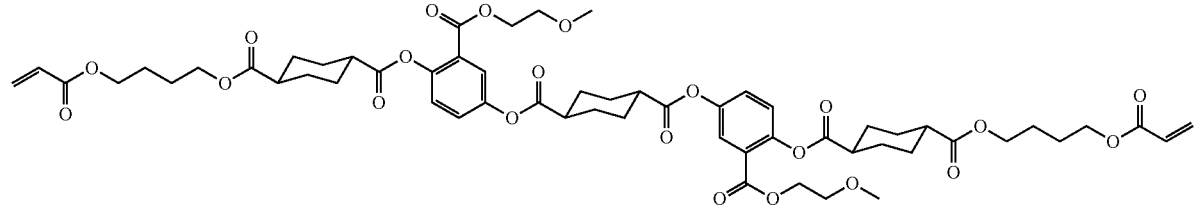

-continued
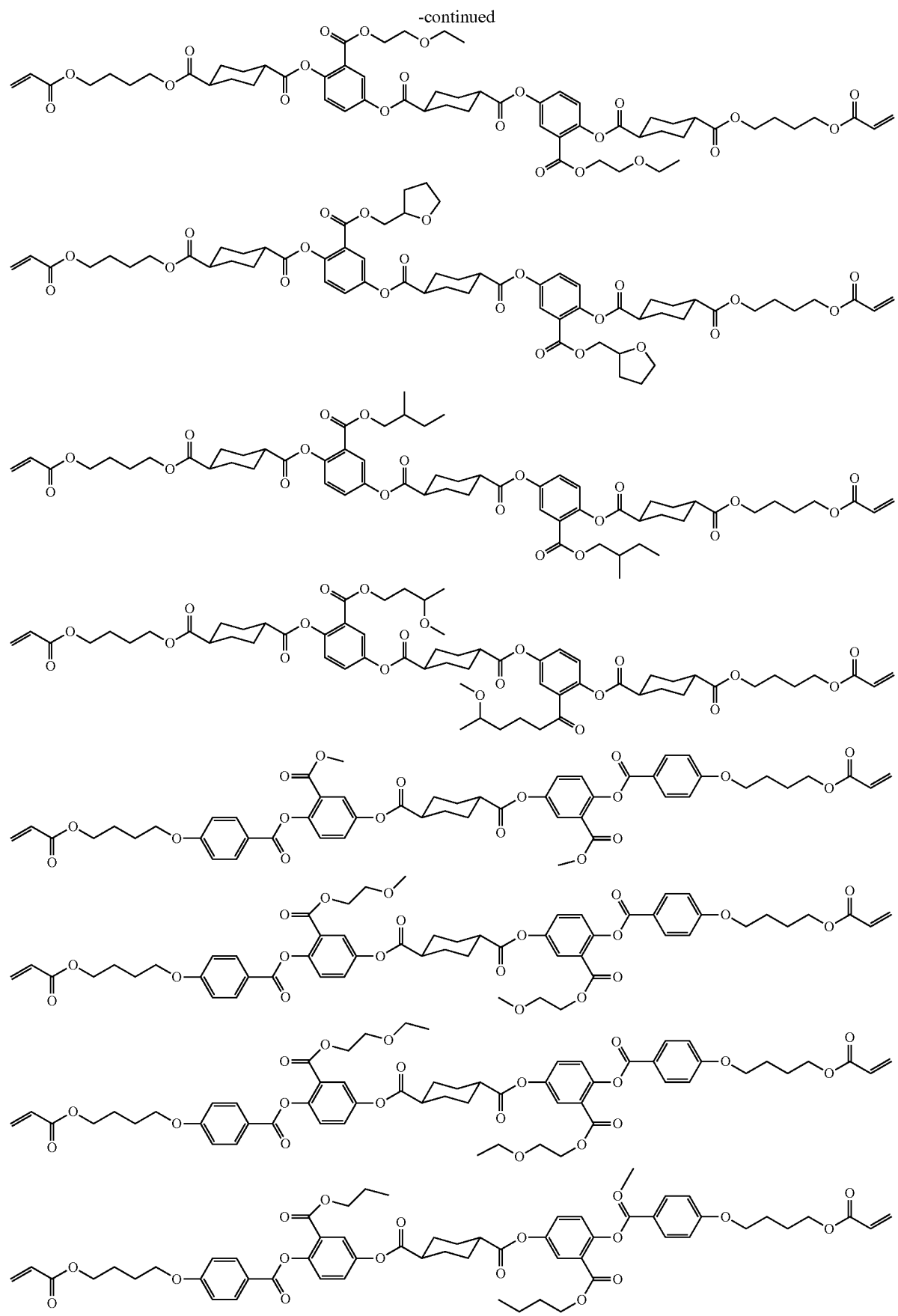

31                                                                  32
-continued
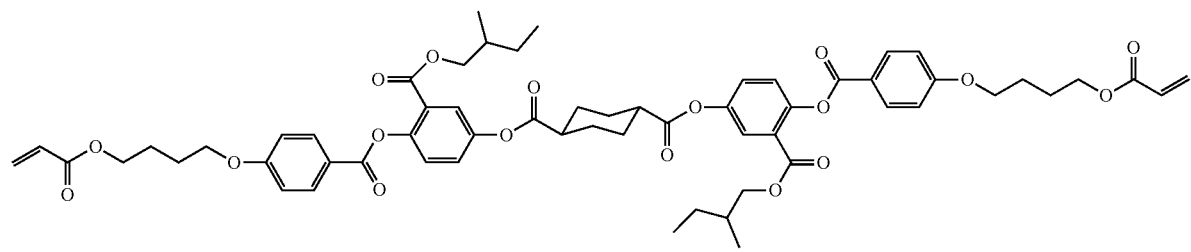
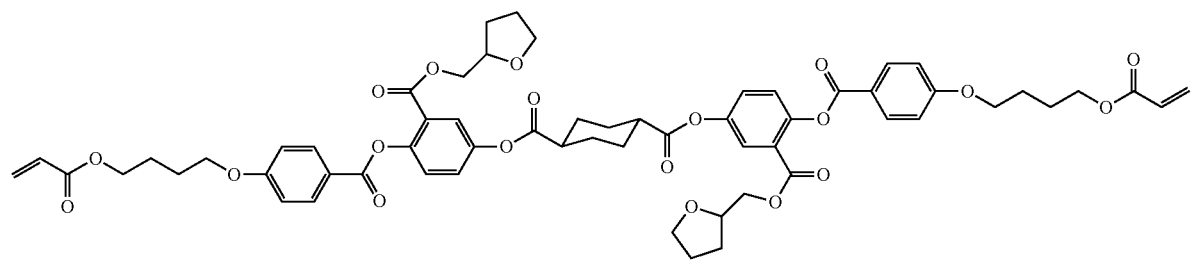
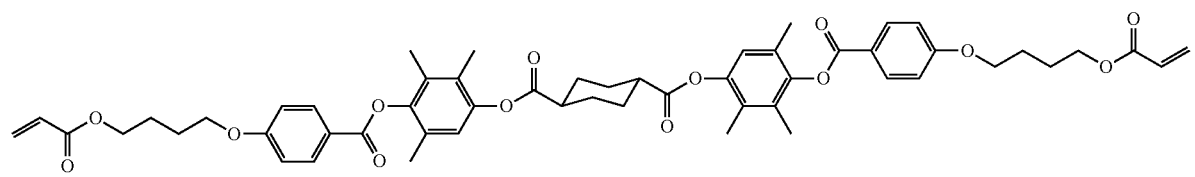
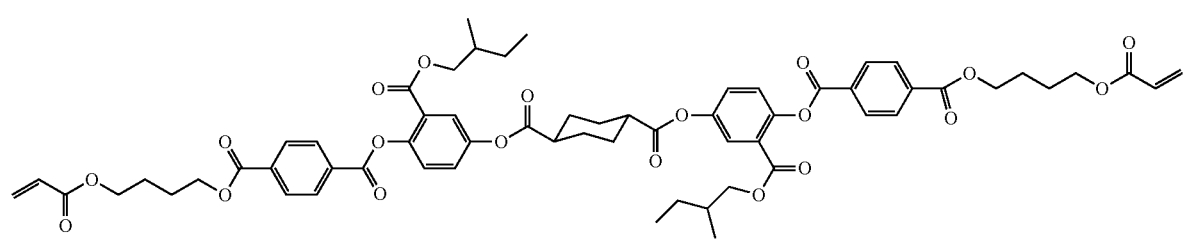
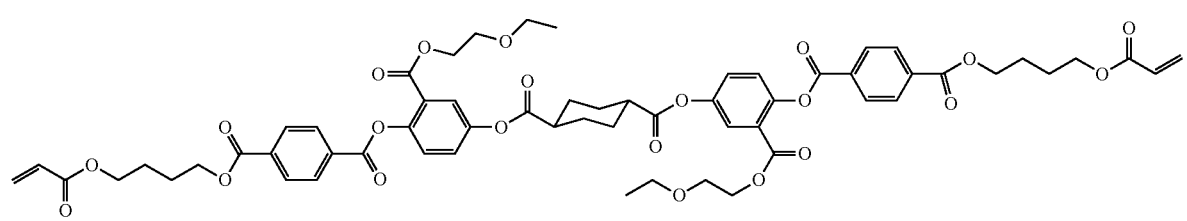
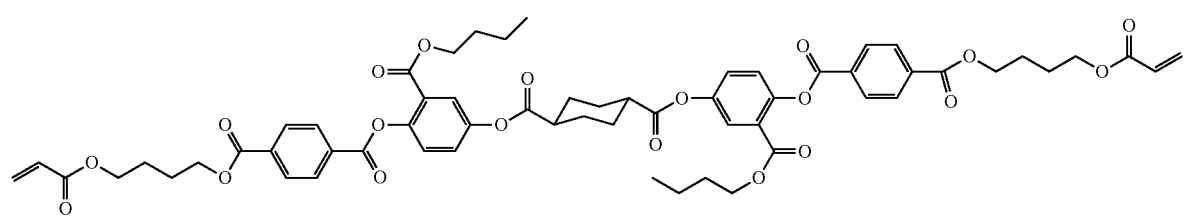
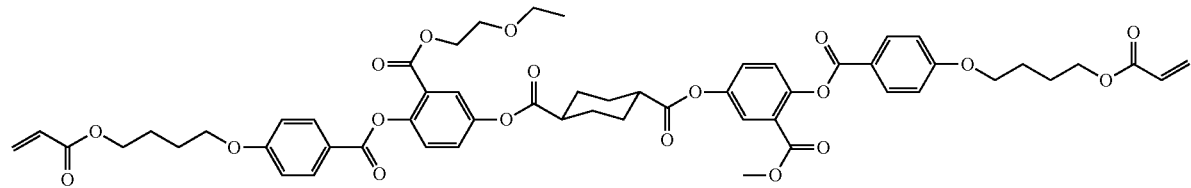

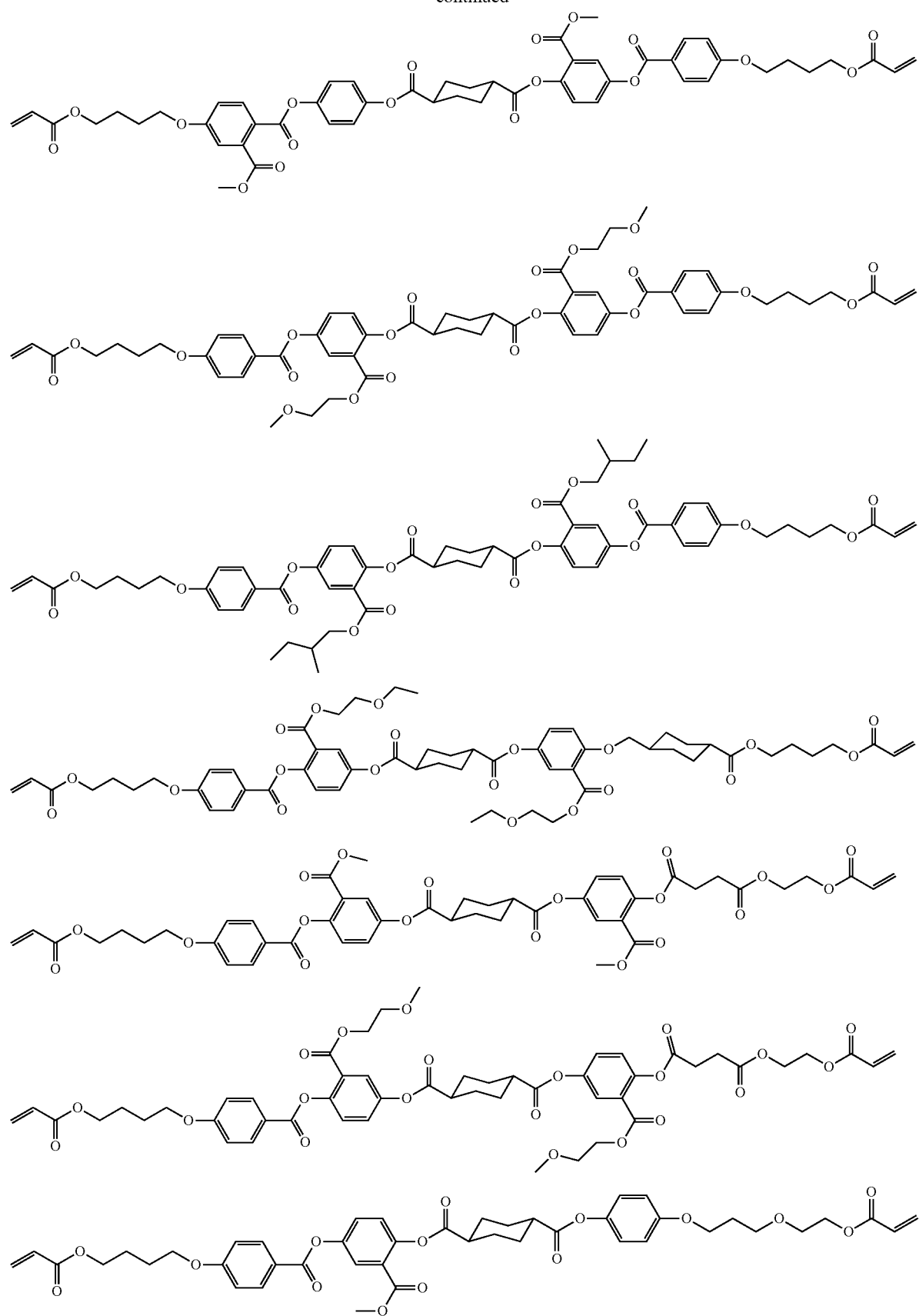

-continued
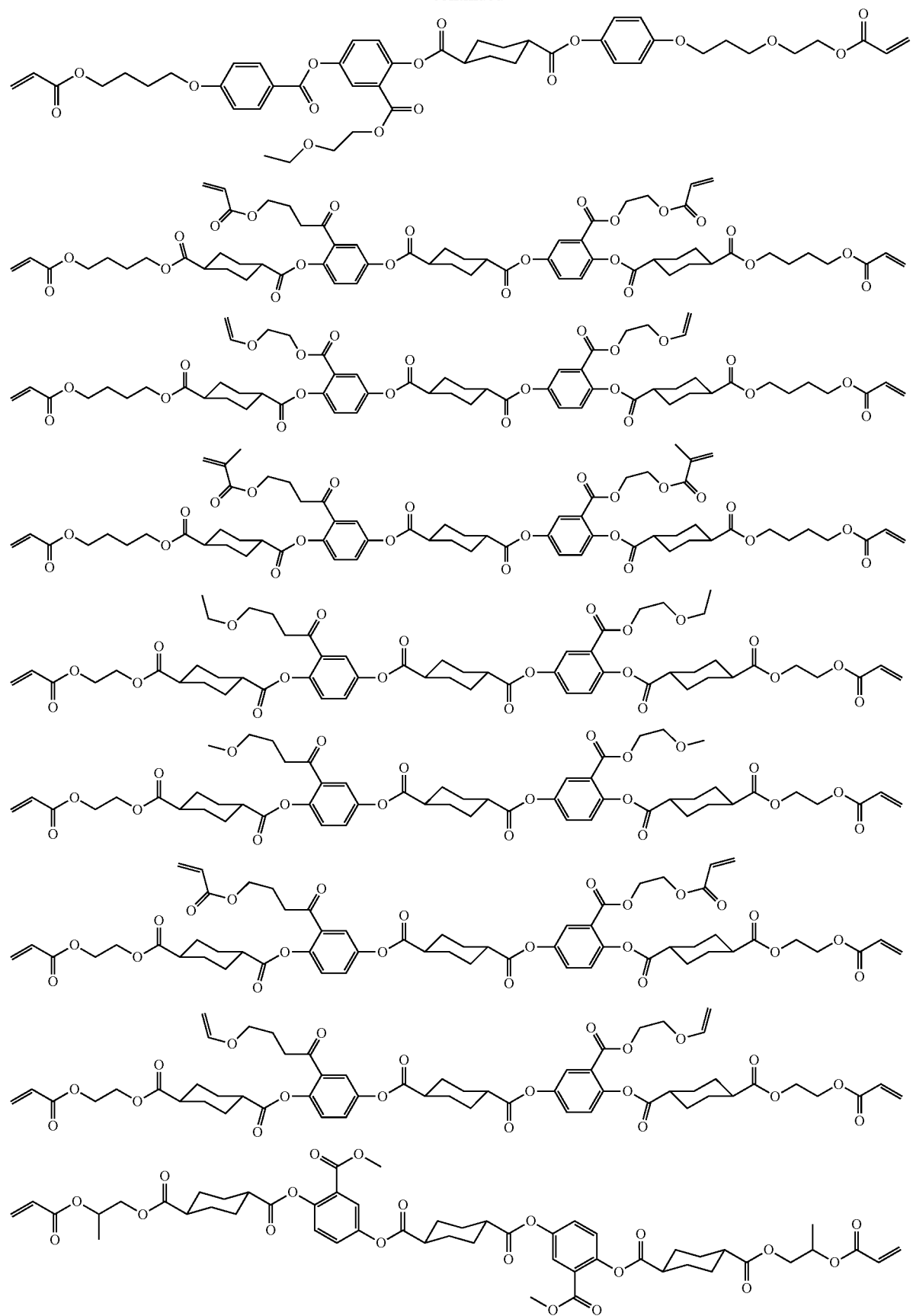

-continued
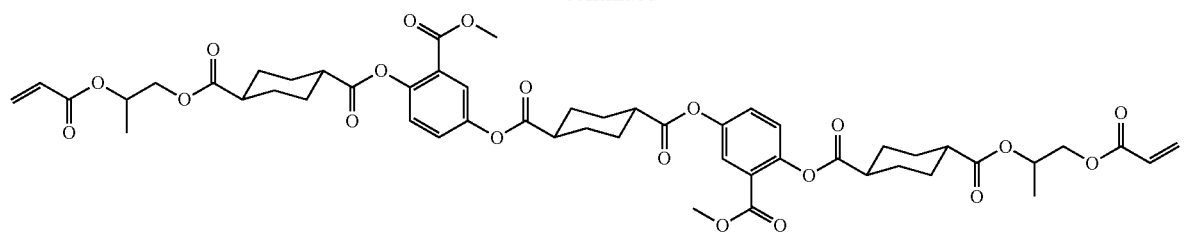
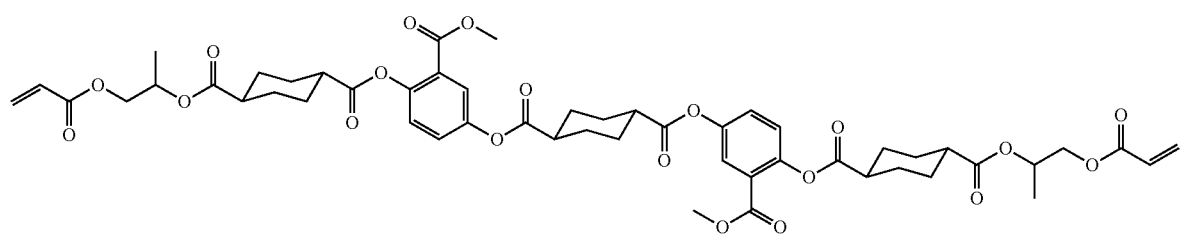
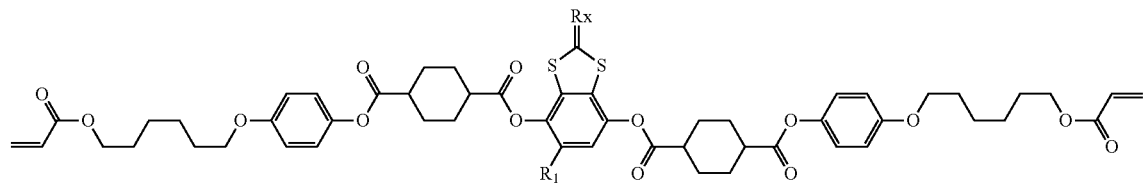
| No | Rx | R1 |
|---|---|---|
| II-2-1 | NC―*―CN | H |
| II-2-2 | NC―*―C(O)―O―CH₃ (methyl cyanoacetate group) | H |
| II-2-3 | NC―*―C(O)―O―butyl | H |
| II-2-4 | NC―*―C(O)―O―CH₂CH₂―O―C(CH₃)₂―OH | H |
| II-2-5 | NC―*―CN | CH₃ |
| II-2-6 | NC―*―CN | ―C(CH₃)₃ |
| II-2-7 | S | H |
*represents a bonding position General Formula 1
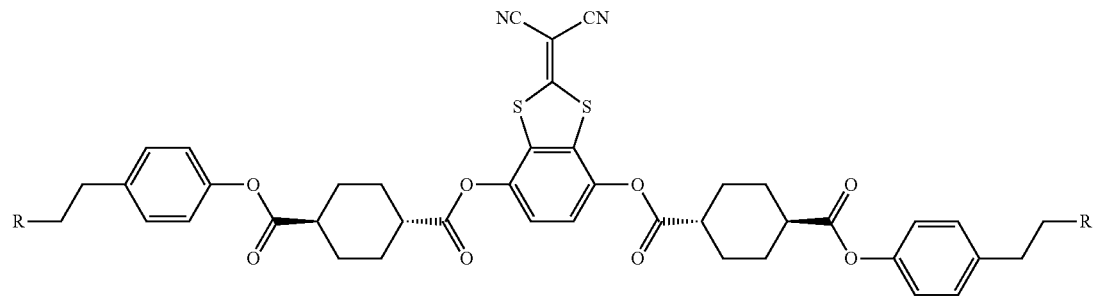
R =
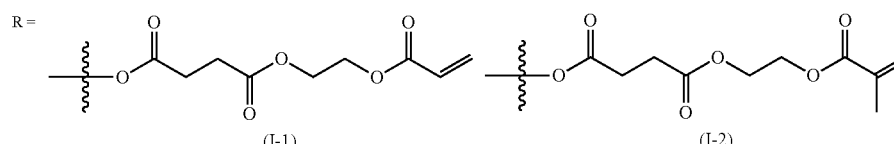
(I-1)　(I-2)
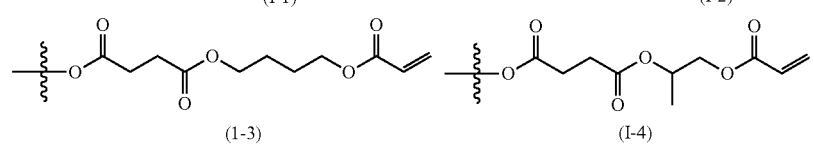
(I-3)　(I-4)
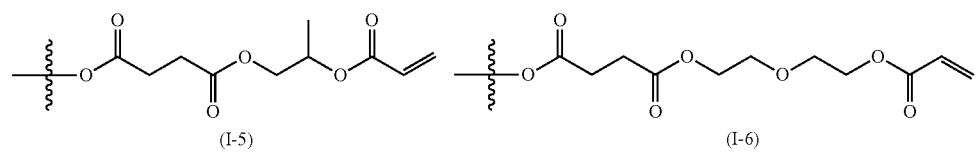
(I-5)　(I-6)
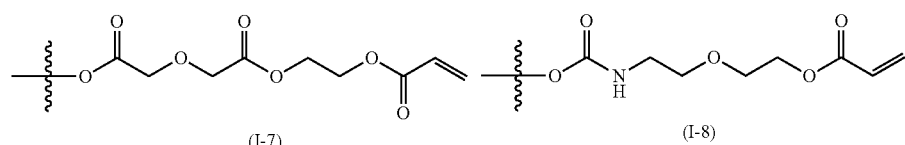
(I-7)　(I-8)
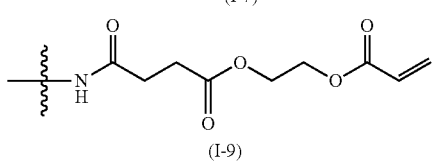
(I-9)
R =
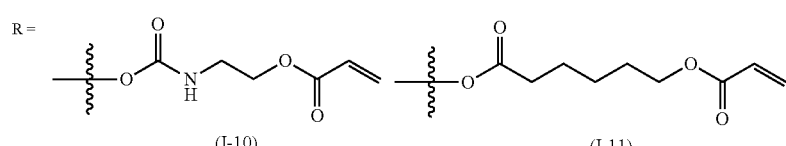
(I-10)　(I-11)
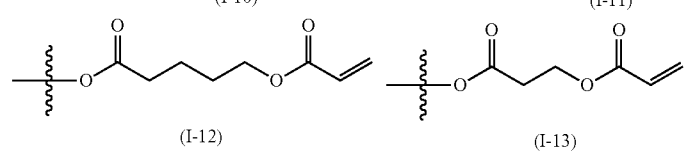
(I-12)　(I-13)

-continued
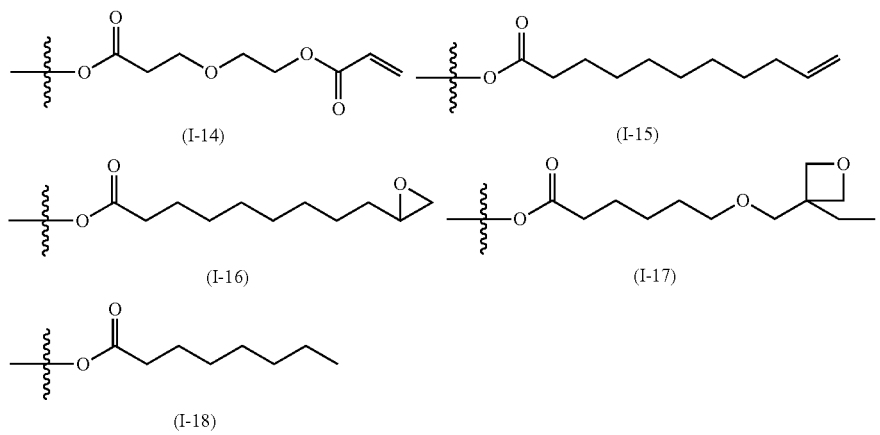
(I-14) (I-15) (I-16) (I-17) (I-18)
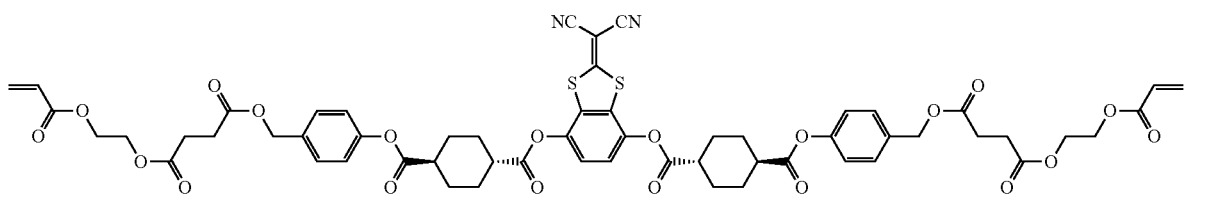
(II-1)
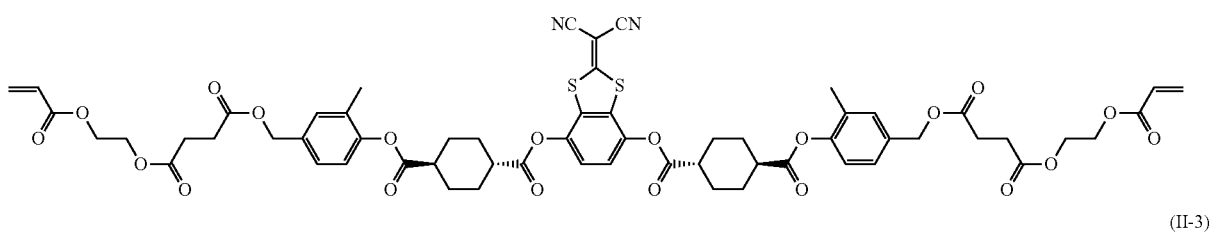
(II-2)
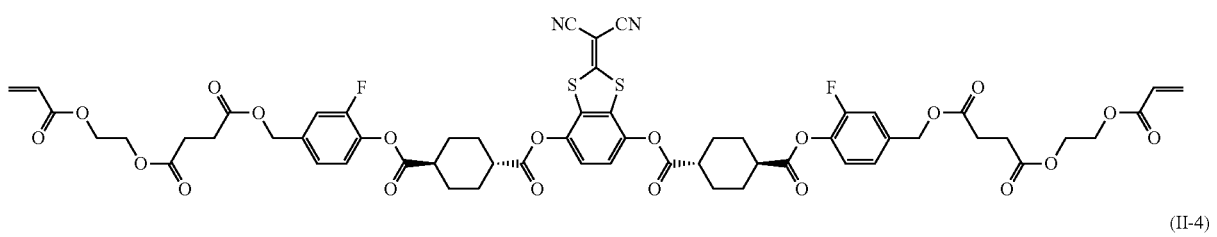
(II-3)
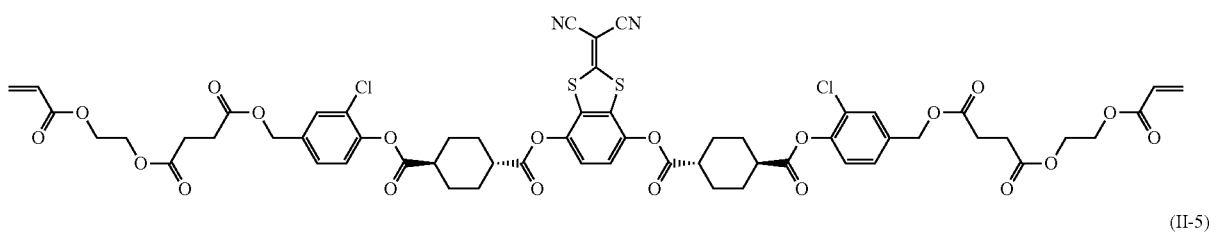
(II-4)
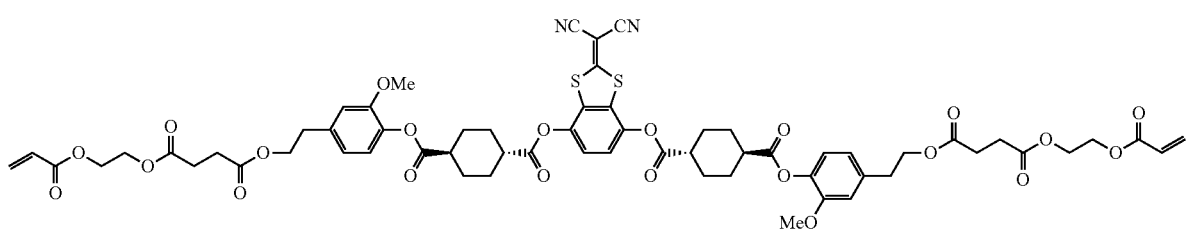
(II-5)

(II-6)
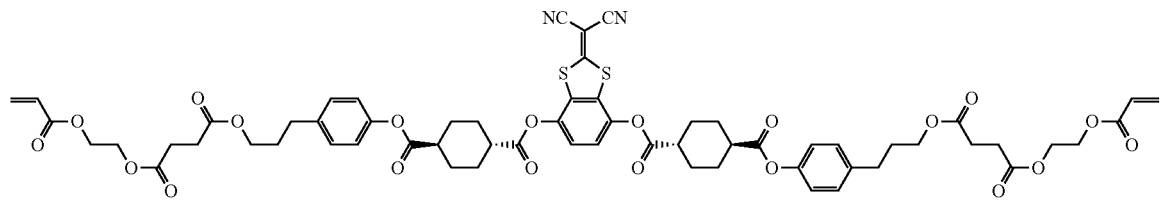
(II-7)
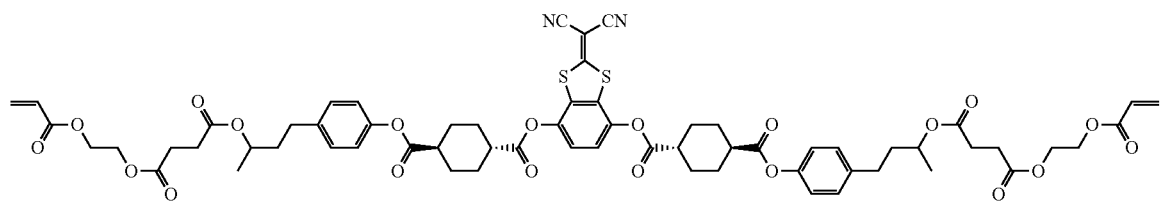
(II-8)
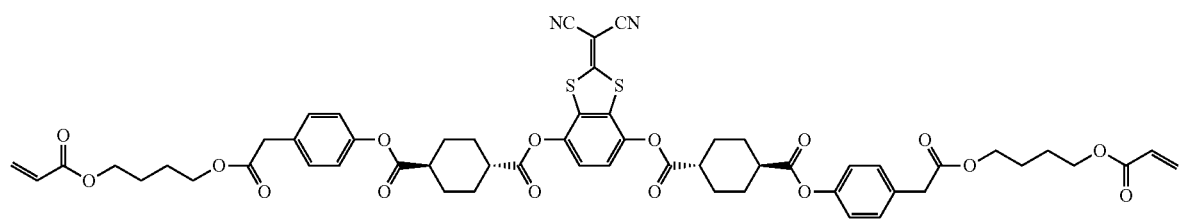
(II-9)
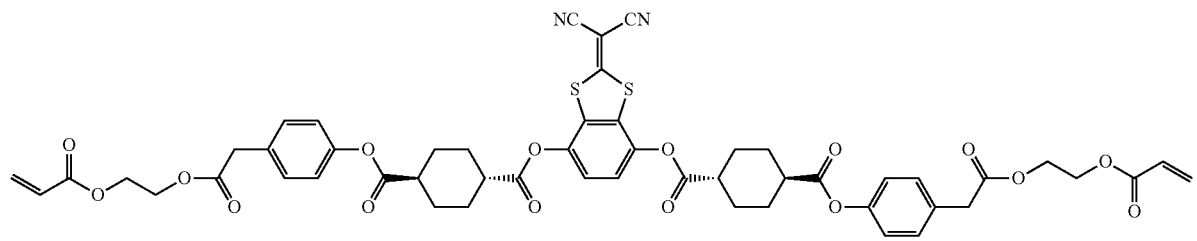
(II-10)
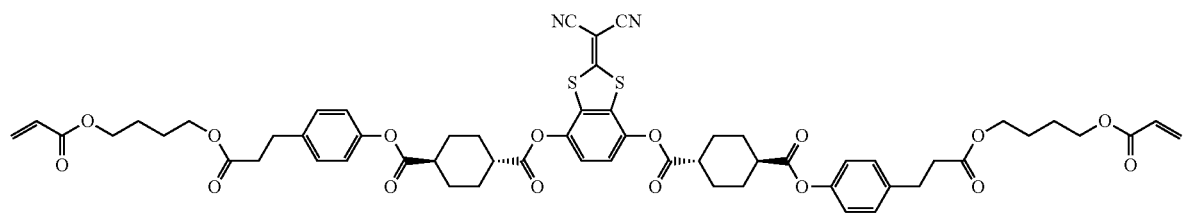
General Formula III
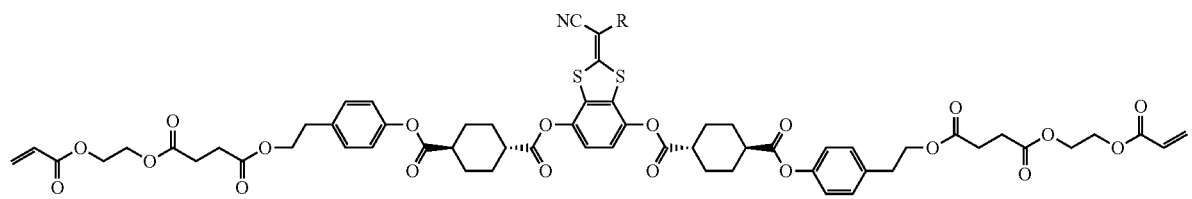

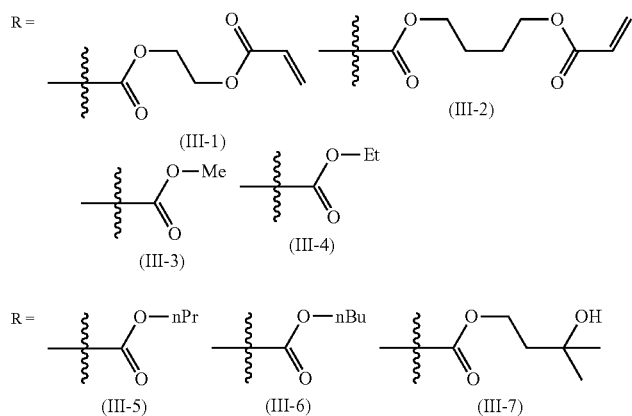

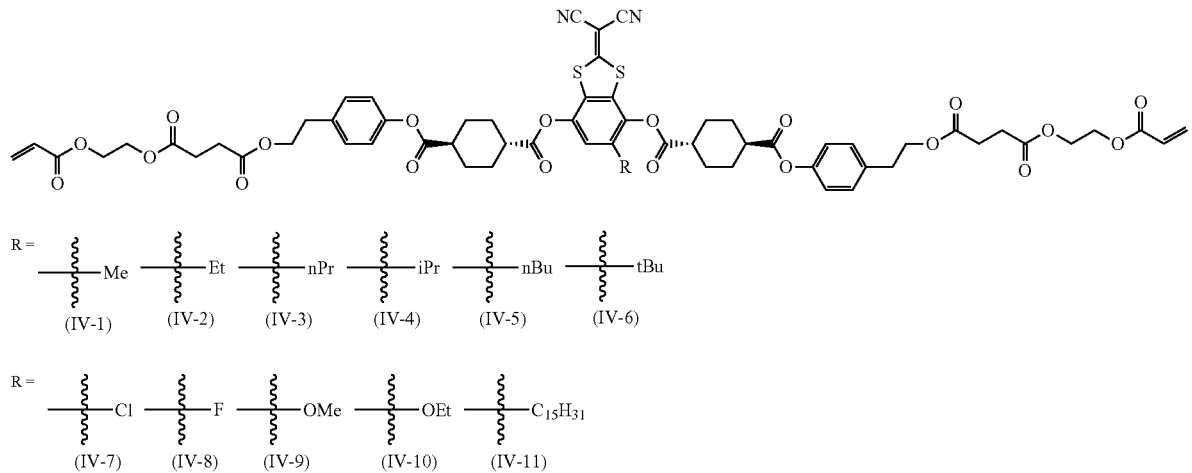

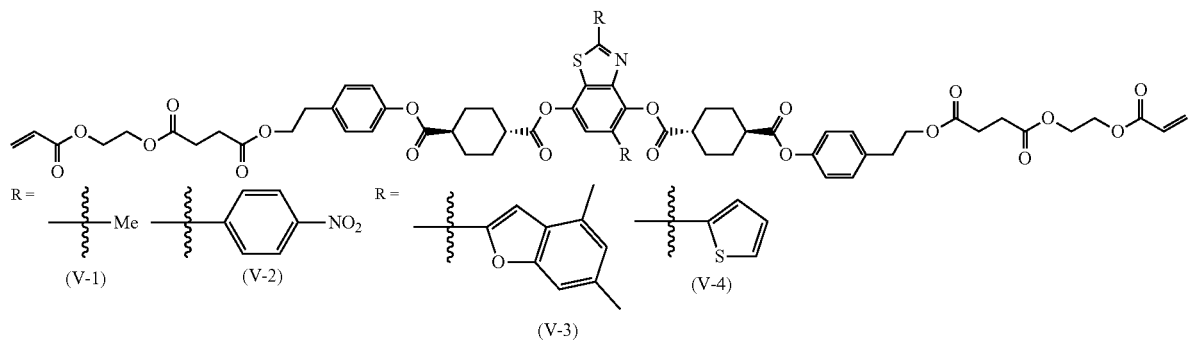

The polymerizable liquid crystal compounds represented by Formula (I) may be used singly or may be used in combination of two or more thereof.

For example, it is preferable that the polymerizable composition of the present invention includes at least one type of the compound represented by Formula (I-12) and at least one type of the compound represented by Formula (I-22) as the polymerizable liquid crystal compound represented by Formula (I).

At this time, the content ratio of the polymerizable liquid crystal compound represented by Formula (I-12) and the compound represented by Formula (I-22) is not particularly limited but the mass ratio of the polymerizable liquid crystal compound represented by Formula (I-12): polymerizable liquid crystal compound represented by Formula (I-22) is preferably 90:10 to 10:90, is more preferably 80:20 to 15:85, and is even more preferably 50:50 to 20:80.

The polymerizable liquid crystal compound represented by Formula (I) can be manufactured by a known method and can be manufactured by, for example, performing esterification by using a phenol (or alcohol) derivative A-11 and carboxylic acid derivatives A-21 and A-31.

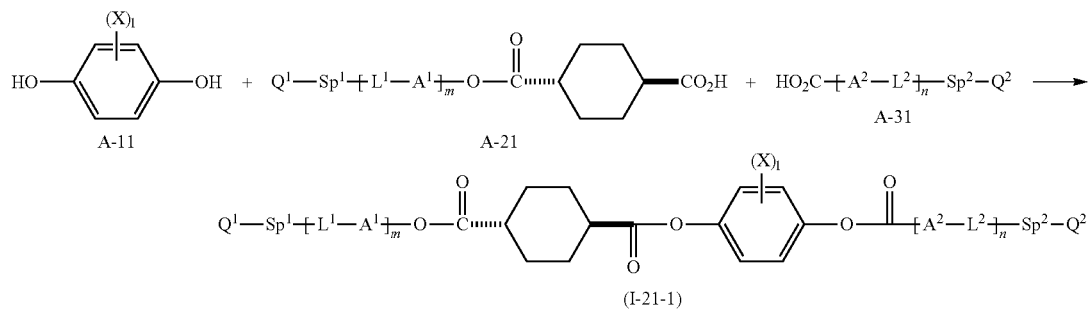

(I-21-1)

Examples of an esterification method include a method of allowing an activated carboxylic acid and a phenol (or alcohol) derivative to act in the presence of a base, and a method of directly esterifying a carboxylic acid and a phenol (or alcohol) derivative by using a condensation agent such as carbodiimide. A method of activating a carboxylic acid is more preferable from the viewpoint of a by-product.

An activation method of a carboxylic acid includes acid chlorination using thionyl chloride, oxalyl chloride, or the like, and a method of allowing mesyl chloride to act and of preparing a mixed acid anhydride.

The polymerizable liquid crystal compound represented by Formula (I) generally has liquid crystallinity and low birefringence, and thus, the birefringence of a phase difference film can be adjusted to be in a desired range by preparing the phase difference film by using the polymerizable liquid crystal compound represented by Formula (I). In particular, a cholesteric liquid crystalline phase is formed by using the polymerizable liquid crystal compound represented by Formula (I), and a film is formed by immobilizing the cholesteric liquid crystalline phase. Thus, it is possible to obtain a reflection film having a narrow wavelength range of selective reflection, that is, a reflection film having high selectivity in a reflection wavelength range.

In addition, the polymerizable liquid crystal compound represented by Formula (I) satisfies a plurality of properties such as being colorless and transparent, having a wide liquid crystalline phase range, being easily dissolved in a solvent, and being easily polymerized, since absorption in a visible light range is extremely low regardless of the type of substituent of an aromatic ring or a linking group. According to this, a cured film which is prepared by using a polymerizable composition including the polymerizable liquid crystal compound represented by Formula (I) can satisfy a plurality of properties such as having a sufficient hardness, being colorless and transparent, having excellent weather fastness and excellent heat resistance. Accordingly, the cured film formed by using the polymerizable composition described above, for example, can be used in various applications such as a phase difference plate, a polarization element, a selective reflection film, a color filter, an antireflection film, a view angle compensation film, a holography, and an alignment film which are constituents of an optical element.

The total amount of the polymerizable liquid crystal compound represented by Formula (I) may be greater than or equal to 10 mass %, preferably 30 to 99.9 mass %, more preferably 50 to 99.5 mass %, and even more preferably 70 to 99 mass % with respect to the mass of the solid content of the polymerizable composition. Here, the total amount of the polymerizable liquid crystal compound is not limited to this range.

[Oxime Compound]

The polymerizable composition of the present invention includes an oxime compound as a polymerization initiator. The present inventors have found that incorporation of an oxime compound in the polymerizable composition including the polymerizable liquid crystal compound represented by Formula (I) as a polymerization initiator hardly causes yellowing after curing. Particularly, the present inventors have found that yellowing easily occurring in a moisture resistance test of a film formed by curing the polymerizable composition including the polymerizable liquid crystal compound represented by Formula (I) is reduced. It is considered that this is because the partial structure formed by ester-bonding the cyclohexylene group and the phenylene group in the polymerizable liquid crystal compound represented by Formula (I) is hardly decomposed by the oxime compound.

In the specification, the oxime compound means a compound having a partial structure of >C=N—O— in the molecule. Examples of the oxime compound include an oxime ester compound and an oxime sulfonic acid ester compound. The oxime ester compound means a compound having a partial structure of >C=N—O—C(=O)— in the molecule and the oxime sulfonic acid ester compound means a compound having a partial structure of >C=N—O—SO$_2$— in the molecule. The oxime compound is preferably an oxime ester compound.

Examples of the oxime ester compounds include compounds described in J. C. S. Perkin II (1979) 1653-1660, J. C. S. Perkin II (1979) 156-162, Journal of Photopolymer Science and Technology (1995) 202-232, compounds described in JP2000-66385A, and compounds described in JP2000-80068A and JP2004-534797A, and compounds described in paragraphs 0151 to 0219 of JP2013-076086A (Fujifilm), and suitable commercially available products thereof include IRGACURE OXE 01 (1.2-octanedione, 1-[4-(phenylthio)-, 2-(o-benzoyl oxime)]), and IRGACURE OXE 02 (ethanone, 1-[9-ethyl-6-(2-methylbenzoyl)-9H-carbazol-3-yl]-, 1-(o-acetyloxime)) manufactured by BASF SE, TR-PBG-304 (manufactured by Changzhou Tronly New Electronic Materials Co., Ltd.), and ADEKA OPTOMER N1919, product name, manufactured by ADEKA Corporation.

Further, cyclic oxime compounds described in JP2007-231000A and JP2007-322744A can be suitably used.

The most preferable examples thereof include oxime compounds having a specific substituent described in JP2007-269779A and oxime compounds having a thioaryl group described in JP2009-191061A.

In addition, the oxime compounds shown below can be preferably used.

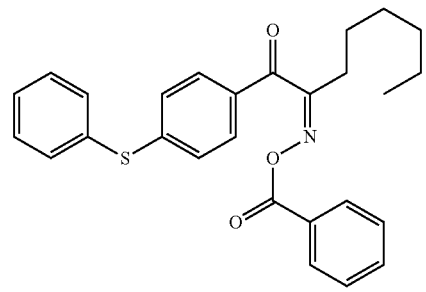

IRGACURE-OXE01

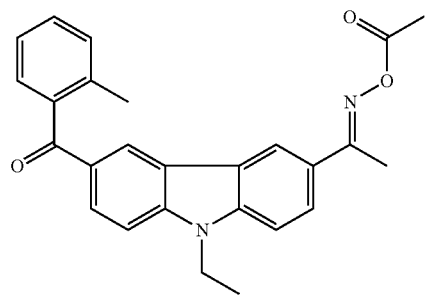

IRGACURE-OXE02

(O-1)

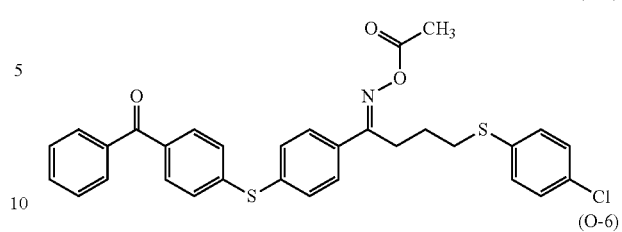

(O-2)

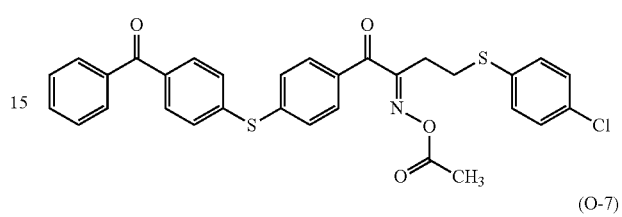

(O-3)

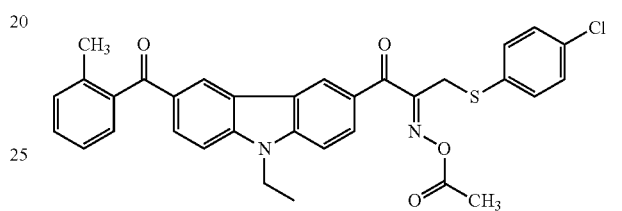

(O-4)

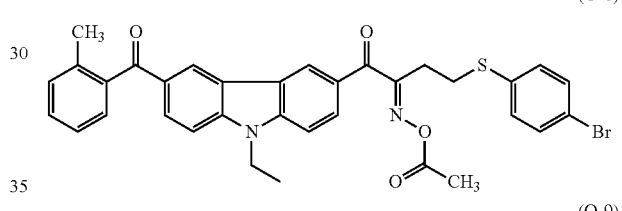

(O-5)

(O-6)

(O-7)

(O-8)

(O-9)

(O-10)

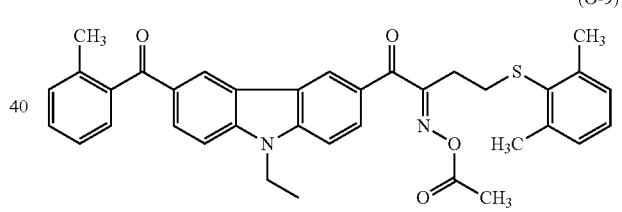

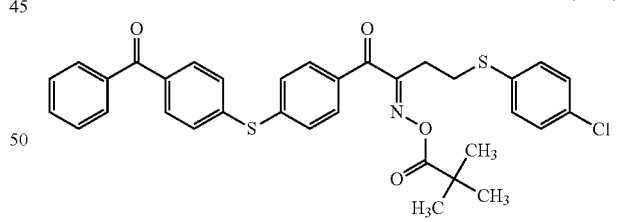

The oxime compound is an oxime compound having a maximum absorption wavelength in a wavelength range of 350 nm to 500 nm, is preferably an oxime compound having an absorption wavelength in a wavelength range of 360 nm to 480 nm, and is particularly preferably an oxime compound having high absorbance in a wavelength range of 365 nm and 455 nm.

The molar light absorption coefficient of the oxime compound is preferably 3,000 to 300,000, is more preferably 5,000 to 300,000, and is particularly preferably 10,000 to 200,000 in a wavelength range of 365 nm or 405 nm from the viewpoint of sensitivity.

The molar light absorption coefficient of the compound is a value measured at a concentration of 0.01 g/L in an ethyl acetate solvent using a spectrophotometer for ultraviolet and visible regions (Carry-5 spectrophotometer manufactured by Varian).

The oxime compounds may be used singly or may be used in combination of two or more thereof.

The content of the oxime compound in the polymerizable composition is preferably 0.01 mass % to 30 mass %, is more preferably 0.1 mass % to 20 mass %, is even more preferably 0.1 mass % to 10 mass %, and is particularly preferably 1 mass % to 5 mass % with respect to the mass of the solid content (the mass excluding the solvent).

[Other Polymerization Initiators]

The polymerizable composition of the present invention may contain other polymerization initiators. Examples of other polymerization initiators include an α-carbonyl compound (described in the specification of each of U.S. Pat. Nos. 2,367,661A and 2,367,670A), acyloin ether (described in the specification of U.S. Pat. No. 2,448,828A), an α-hydrocarbon substituted aromatic acyloin compound (described in the specification of U.S. Pat. No. 2,722,512A), a polynuclear quinone compound (described in the specification of each of U.S. Pat. Nos. 3,046,127A and 2,951,758A), a combination of a triaryl imidazole dimer and p-aminophenylketone (described in the specification of U.S. Pat. No. 3,549,367A), acridine and phenazine compounds (described in JP1985-105667A (JP-S60-105667A) and in the specification of U.S. Pat. No. 4,239,850A), an oxadiazole compound (described in the specification of U.S. Pat. No. 4,212,970A), and an acyl phosphine oxide compound (described in the specification of each of JP1988-40799B (JP-S63-40799B), JP1993-29234B (JP-H05-29234B), JP1998-95788A (JP-H10-95788A), and JP1998-29997A (JP-H10-29997A)).

Specific examples of other polymerization initiators include IRGACURE 907, IRGACURE 184, IRGACURE 651, IRGACURE 819, IRGACURE 250, and IRGACURE 369 (all of which are manufactured by BASF SE), KAYACURE BP 100 (manufactured by Nippon Kayaku Co., Ltd.), and ADEKA OPTOMER SP-152 or ADEKA OPTOMERSP-170 (all of which are manufactured by ADEKA Corporation).

The content of other polymerization initiators in the polymerizable composition is preferably 0.01 to 20 mass % and is more preferably 0.1 to 8 mass % with respect to the mass of the solid content (the mass excluding the solvent) of the polymerizable composition.

[Other Liquid Crystal Compounds]

The polymerizable composition may contain one or more other liquid crystal compounds along with the polymerizable liquid crystal compound represented by Formula (I). The polymerizable liquid crystal compound represented by Formula (I) has high compatibility with respect to the other liquid crystal compounds, and thus, even in a case of being mixed with the other liquid crystal compounds, it is possible to form a film having high transparency without the occurrence of opacification or the like. The other liquid crystal compounds can be used together, and thus, it is possible to provide compositions having various compositions suitable for various applications. Examples of the other liquid crystal compounds which can be used together include a rod-like nematic liquid crystal compound. Examples of the rod-like nematic liquid crystal compound include azomethines, azoxys, cyanobiphenyls, cyanophenyl esters, benzoic acid esters, phenyl cyclohexane carboxylic acid esters, cyanophenyl cyclohexanes, cyano-substituted phenyl pyrimidines, alkoxy-substituted phenyl pyrimidines, phenyl dioxanes, tolans, and alkenyl cyclohexyl benzonitriles. It is possible to use not only a low molecular liquid crystal compound but also a high molecular liquid crystal compound.

The other liquid crystal compounds may be a polymerizable liquid crystal compound or a non-polymerizable liquid crystal compound. A rod-like liquid crystal compound not having a polymerizable group is described in various literatures (for example, Y. Goto et. al., Mol. Cryst. Liq. Cryst. 1995, Vol. 260, pp. 23-28).

A polymerizable rod-like liquid crystal compound can be obtained by introducing a polymerizable group into a rod-like liquid crystal compound. Examples of the polymerizable group include an unsaturated polymerizable group, an epoxy group, and an aziridinyl group, and among them, the unsaturated polymerizable group is preferable, and an ethylenically unsaturated polymerizable group is particularly preferable. The polymerizable group can be introduced into the molecules of the rod-like liquid crystal compound by various methods. The number of polymerizable groups in the polymerizable rod-like liquid crystal compound is preferably 1 to 6, and is more preferably 1 to 3. Examples of the polymerizable rod-like liquid crystal compound include compounds described in Makromol. Chem., Vol. 190, p. 2255 (1989), Advanced Materials Vol. 5, p. 107 (1993), the specification of U.S. Pat. No. 4,683,327A, the specification of U.S. Pat. No. 5,622,648A, the specification of U.S. Pat. No. 5,770,107A, WO95/22586A, WO95/24455A, WO97/00600A, WO98/23580A, WO98/52905A, JP1989-272551A (JP-H01-272551A), JP1994-16616A (JP-H06-16616A), JP1995-110469A (JP-H07-110469A), JP1999-80081A (JP-H11-80081A), JP2001-328973A, JP2014-198814A, and the like. Two or more types of polymerizable rod-like liquid crystal compounds may be used together. In a case where two or more types of polymerizable rod-like liquid crystal compounds are used, it is possible to decrease an alignment temperature.

The amount of the other liquid crystal compounds added is not particularly limited, but is preferably 0% to 70 mass %, is more preferably 0% to 50 mass %, and is even more preferably 0 to 30 mass %, with respect to the mass of solid contents of the polymerizable composition. However, the added amount of the other liquid crystal compounds is not limited to the range described above. In the polymerizable composition, a mass ratio of the polymerizable liquid crystal compound represented by Formula (I) to the other liquid crystal compounds (Mass of Polymerizable Liquid Crystal Compound represented by Formula (I)/Mass of Other Liquid Crystal Compounds) may be 100/0 to 30/70, is preferably 100/0 to 50/50, and is more preferably 100/0 to 70/30. The ratio can be adjusted to be in a preferable range according to the application.

[Chiral Compound]

The polymerizable composition may contain a chiral compound. By using the chiral compound, it is possible to prepare the polymerizable composition as a composition having a cholesteric liquid crystalline phase. The chiral compound may be a liquid crystalline chiral compound, or may be a non-liquid crystalline chiral compound. The chiral compound can be selected from various known chiral agents (for example, described in Liquid Crystal Device Handbook, Chap. 3, Sec. 4-3, Chiral Agent for TN and STN, p. 199, Japan Society for the Promotion of Science, edited by The 142-nd Committee, 1989). In general, the chiral compound has an asymmetric carbon atom, and an axially asymmetric compound or a planarly asymmetric compound which does not have an asymmetric carbon atom can be used. Examples of the axially asymmetric compound or the planarly asymmetric compound include binaphthyl, helicene, paracyclophane, and derivatives thereof. The chiral compound (a chiral agent) may have a polymerizable group. In a case where the chiral compound has a polymerizable group, and the rod-like liquid crystal compound to be used together also has a polymerizable group, it is possible to form a polymer having a repeating unit derived from the rod-like liquid crystal compound and a repeating unit derived from the chiral compound by a polymerization reaction between a polymerizable chiral compound and a polymerizable rod-like liquid crystal compound. Therefore, the polymerizable group in the polymerizable chiral compound is a polymerizable rod-like liquid crystal compound, and in particularly, is preferably a group identical to the polymerizable group in the polymerizable liquid crystal compound represented by Formula (I). Accordingly, the polymerizable group of the chiral compound is preferably an unsaturated polymerizable group, an epoxy group, or an aziridinyl group, is more preferably an unsaturated polymerizable group, and is particularly preferably an ethylenically unsaturated polymerizable group.

In the polymerizable composition, it is preferable that the content of the chiral compound is 0.5 to 30 mass % with respect to a liquid crystal compound containing the polymerizable liquid crystal compound represented by Formula (I). It is preferable that a use amount of the chiral compound is small since a small amount of chiral compound does not tend to affect liquid crystallinity. Accordingly, a compound which has a strong twisting force such that twisted alignment at a desired spiral pitch can be attained even in a case where a small amount of chiral compound is used is preferable as the chiral compound. Examples of such a chiral agent having a strong twisting force include a chiral agent described in JP2003-287623A. In addition, chiral agents described in JP2002-302487A, JP2002-80478A, JP2002-80851A, and JP2014-034581A, LC-756 manufactured by BASF SE, and the like are included.

A film formed by setting the polymerizable composition containing the chiral compound to a cholesteric liquid crystalline phase, and then by immobilizing the cholesteric liquid crystalline phase has selective reflection properties with respect to light at a predetermined wavelength according to a spiral pitch, and is useful as a reflection film (for example, a visible light reflection film or an infrared ray reflection film). By using the polymerizable liquid crystal compound represented by Formula (I) which has low birefringence, there is an advantage in that a reflection wavelength range becomes narrower, and selectivity becomes higher, compared to a film having the same thickness in which a liquid crystal compound having higher birefringence is used.

[Alignment Control Agent]

An alignment control agent which contributes to stable or prompt formation of a liquid crystalline phase (for example, a cholesteric liquid crystalline phase) may be added to the polymerizable composition. Examples of the alignment control agent include a fluorine-containing (meth)acrylate-based polymer, compounds represented by General Formulas (X1) to (X3) described in WO2011/162291A, and a compound described in paragraphs [0020] to [0031] of JP2013-47204A. The polymerizable composition may contain two or more types of compounds selected from the compounds described above. The compounds can reduce tilt angles of the molecules of the liquid crystal compound or substantially horizontally align the tilt angles in an air interface of a layer. Furthermore, in the specification, "horizontal alignment" indicates that a major axis of a liquid crystal molecule is parallel to a surface of a film, but does not indicate that the major axis of the liquid crystal molecule is required to be exactly parallel to the surface of the film, and in the specification, the "horizontal alignment" indicates alignment in which a tilt angle with respect to a horizontal surface is less than 20 degrees. In a case where the liquid crystal compound is horizontally aligned in the vicinity of the air interface, an alignment defect rarely occurs, and thus, transparency in a visible light range increases. In contrast, in a case where the molecules of the liquid crystal compound are aligned at a large tilt angle, for example, the liquid crystal compound is set to a cholesteric liquid crystalline phase, this is not preferable since a spiral axis thereof is shifted from a normal direction of the surface of the film, and thus, reflectivity decreases or a fingerprint pattern is generated, and haze increases or diffraction properties are exhibited.

Examples of the fluorine-containing (meth)acrylate-based polymer which can be used as the alignment control agent are described in [0018] to [0043] of JP2007-272185A, and the like.

One type of compound may be independently used, or two or more types of compounds may be used together, as the alignment control agent.

The content of the alignment control agent in the polymerizable composition is preferably 0.01 to 10 mass %, is more preferably 0.01 to 5 mass %, and is particularly preferably 0.02 to 1 mass %, with respect to the mass of the compound represented by Formula (I).

[Cross-Linking Agent]

The polymerizable composition may arbitrarily contain a cross-linking agent in order to improve a film hardness after being cured and to improve durability. A cross-linking agent which is cured by an ultraviolet ray, heat, humidity, and the like can be suitably used as the cross-linking agent.

The cross-linking agent is not particularly limited, but can be suitably selected according to the purpose, and examples of the cross-linking agent include a polyfunctional acrylate compound such as trimethylol propane tri(meth)acrylate, pentaerythritol tri(meth)acrylate, and pentaerythritol tetraacrylate; an epoxy compound such as glycidyl (meth) acrylate and ethylene glycol diglycidyl ether; an aziridine compound such as 2,2-bishydroxy methyl butanol-tris[3-(1-aziridinyl) propionate] and 4,4-bis(ethylene iminocarbonyl amino) diphenyl methane; an isocyanate compound such as hexamethylene diisocyanate and biuret type isocyanate; a polyoxazoline compound having an oxazoline group in a side chain; an alkoxy silane compound such as vinyl trimethoxy silane and N-(2-aminoethyl)3-aminopropyl trimethoxy silane, and the like. In addition, a known catalyst can be used according to the reactivity of the cross-linking agent, and thus, productivity can be improved in addition to the improvement in the film hardness and the durability. One type of the compound may be independently used, or two or more types thereof may be used together.

The content of the cross-linking agent is preferably 3 mass % to 20 mass %, and is more preferably 5 mass % to 15 mass %, with respect to the mass of solid contents of the polymerizable composition. In a case where the content of the cross-linking agent is greater than or equal to 3 mass %, a cross-linking density improvement effect further increases, and in a case where the content of the cross-linking agent is less than or equal to 20 mass %, stability of a cholesteric liquid crystal layer becomes higher.

[Other Additives]

The polymerizable composition may contain one type or two or more types of other additives such as an antioxidant, an ultraviolet absorbent, a sensitizing agent, a stabilizer, a plasticizer, a chain transfer agent, a polymerization inhibitor, an anti-foaming agent, a leveling agent, a thickener, a flame retardant, a surface-active substance, a dispersant, and a coloring material such as a dye and pigment.

<Film>

The polymerizable composition of the present invention is useful as a material of various optical films such as a phase difference film and a reflection film, and can form various optical films by using the polymerizable composition of the present invention.

[Manufacturing Method of Film]

An example of a manufacturing method of an optical film is a manufacturing method, including at least:

(i) applying a polymerizable composition onto a surface of a substrate or the like, and setting the polymerizable composition to be in a state of a liquid crystalline phase (a cholesteric liquid crystalline phase or the like); and, (ii) performing a curing reaction with respect to the polymerizable composition, and forming a cured film by immobilizing the liquid crystalline phase.

The steps of (i) and (ii) are repeated a plurality of times, and thus, it is possible to prepare a film in which a plurality of cured films described above are laminated. In addition, the plurality of cured films are bonded to each other by an adhesive, and thus, it is also possible to prepare the film in which the plurality of cured films are laminated.

In the step of (i), first, the polymerizable composition is applied onto the surface of the substrate or the surface of an alignment film formed on the substrate. It is preferable that the polymerizable composition is prepared as a coating liquid in which a material is dissolved and/or dispersed in a solvent. An organic solvent is preferably used as the solvent which is used for preparing the coating liquid. Examples of the organic solvent include amide (for example, N,N-dimethyl formamide); sulfoxide (for example, dimethyl sulfoxide); a heterocyclic compound (for example, pyridine); hydrocarbon (for example, benzene and hexane); alkyl halide (for example, chloroform and dichloromethane); ester (for example, methyl acetate, butyl acetate, and propylene glycol monoethyl ether acetate); ketone (for example, acetone, methyl ethyl ketone, cyclohexanone, and cyclopentanone); ether (for example, tetrahydrofuran, 1,2-dimethoxy ethane); 1,4-butane diol diacetate, and the like. Among them, the alkyl halide, the ester, and the ketone are particularly preferable. Two or more types of the organic solvents may be used together.

The coating liquid can be applied by various methods such as a wire bar coating method, an extrusion coating method, a direct gravure coating method, a reverse gravure coating method, and a die-coating method. In addition, the composition is ejected from a nozzle of an ink jet device, and thus, the coated film can be formed.

Next, the polymerizable composition which is applied onto the surface and becomes the coated film is set to be in the state of the liquid crystalline phase such as a cholesteric liquid crystalline phase. In an aspect where the polymerizable composition is prepared as a coating liquid containing a solvent, there is a case where the coated film is dried, and the solvent is removed, and thus, it is possible to set the polymerizable composition to be in the state of the liquid crystalline phase. In addition, in order to set a transition temperature with respect to the liquid crystalline phase, as desired, the coated film may be heated. For example, first, the coated film is heated to a temperature of an isotropic phase, and then, is cooled to a liquid crystalline phase transition temperature, and the like, and thus, it is possible to stably set the polymerizable composition to be in the state of the liquid crystalline phase. The liquid crystalline phase transition temperature of the polymerizable composition is preferably in a range of 10° C. to 250° C., and is more preferably in a range of 10° C. to 150° C., from the viewpoint of manufacturing suitability or the like. In a case where the liquid crystalline phase transition temperature of the polymerizable composition is lower than 10° C., a cooling step or the like is required in order to decrease the temperature to a temperature range in which the liquid crystalline phase is exhibited. In addition, in a case where the liquid crystalline phase transition temperature of the polymerizable composition is higher than 250° C., first, a high temperature is required in order to set the polymerizable composition to be in an isotropic liquid state at a temperature higher than the temperature range in which the liquid crystalline phase is exhibited, and thus, this is disadvantageous from the viewpoint of the waste of thermal energy, the deformation of the substrate, deterioration, and the like.

Next, in the step of (ii), the coated film which is in the state of the liquid crystalline phase is cured. The curing may be performed by any polymerization method such as a radical polymerization method, an anionic polymerization method, a cationic polymerization method, and a coordination polymerization method. A suitable polymerization method may be selected according to the polymerizable liquid crystal compound represented by Formula (I). By this polymerization, it is possible to obtain a polymer having a unit derived from the polymerizable liquid crystal compound represented by Formula (I) in a constitutional unit.

In an example, a curing reaction is performed by ultraviolet ray irradiation. In the ultraviolet ray irradiation, a light source such as an ultraviolet ray lamp is used. In this step, the curing reaction of the composition is performed by the ultraviolet ray irradiation, and thus, the liquid crystalline phase (the cholesteric liquid crystalline phase or the like) is immobilized, and the cured film is formed.

An irradiation energy amount of an ultraviolet ray is not particularly limited, but in general, is preferably approximately 0.1 J/cm$^2$ to 0.8 J/cm$^2$. In addition, a time for performing the ultraviolet ray irradiation with respect to the coated film is not particularly limited, and may be determined from the viewpoint of both of a sufficient hardness and sufficient productivity of the cured film.

In order to accelerate the curing reaction, the ultraviolet ray irradiation may be performed under heating conditions. In addition, it is preferable that a temperature at the time of performing the ultraviolet ray irradiation is maintained in a temperature range where the liquid crystalline phase is exhibited such that the liquid crystalline phase is not scattered. In addition, an oxygen concentration in the atmosphere is associated with a degree of polymerization, and thus, in a case where a desired degree of polymerization is not attained in the air, and the film hardness is insufficient, it is preferable to decrease the oxygen concentration in the atmosphere by a method such as nitrogen substitution.

In the step described above, the liquid crystalline phase is immobilized, and the cured film is formed. Here, a state where alignment of a compound formed of a liquid crystalline phase is retained is the most typical and preferred aspect as a state where the liquid crystalline phase is "immobilized". The state is not only limited to this, and specifically, indicates a state where a layer does not have fluidity, an alignment form is not changed by an external field or an external force, and an immobilized alignment form can be stably retained in a temperature range of generally 0° C. to 50° C., and in a temperature range of −30° C. to 70° C. in more rigorous conditions. In the present invention, it is preferable that the alignment state of the liquid crystalline phase is immobilized by the curing reaction which is performed by the ultraviolet ray irradiation.

Furthermore, in the film, it is sufficient that the optical properties of the liquid crystalline phase are retained in the layer, and finally, it is not necessary that the composition in the cured film has liquid crystallinity in advance. For example, the composition may have a high molecular weight by the curing reaction, and may lose the liquid crystallinity in advance.

The thickness of the cured film described above is not particularly limited. A preferred film thickness may be determined according to the application or according to optical properties to be desired. In general, the thickness is preferably 0.05 to 50 µm, and is more preferably 1 to 35 µm.

[Substrate]

The film may include a substrate. The material and the optical properties of the substrate are not particularly limited insofar as the substrate has self-supporting properties, and supports the cured film described above. The substrate can be selected from a glass plate, a quartz plate, a polymer film, and the like. According to the application, a substrate having high transparency with respect to ultraviolet light may be used. Examples of a polymer film having high transmittance with respect to visible light include polymer films for various optical films which are used as a member of a display device such as a liquid crystal display device. Examples of the substrate include a polyester film such as polyethylene terephthalate (PET), polybutylene terephthalate, and polyethylene naphthalate (PEN); a polycarbonate (PC) film, a polymethyl methacrylate film; a polyolefin film such as polyethylene and polypropylene; a polyimide film, a triacetyl cellulose (TAC) film; and the like. The polyethylene terephthalate film and the triacetyl cellulose film are preferable.

[Alignment Layer]

The film may include an alignment layer between the substrate and the cured film. The alignment layer has a function of more accurately defining an alignment direction of the liquid crystal compound. The alignment layer can be disposed by means such as a rubbing treatment of an organic compound (preferably, a polymer), oblique vapor deposition of an inorganic compound, and formation of a layer having a microgroove. Further, an alignment layer is also known in which an alignment function is generated by applying an electric field, by applying a magnetic field, or by performing light irradiation. It is preferable that the alignment layer is formed by performing a rubbing treatment with respect to a surface of a polymer film.

A polymer of an organic compound is preferable as a material to be used in the alignment layer, a polymer which can be cross-linked by itself or a polymer which is cross-linked by a cross-linking agent is commonly used. It is natural that a polymer having both functions is also used. Examples of the polymer can include a polymer such as polymethyl methacrylate, an acrylic acid/methacrylic acid copolymer, a styrene/malein imide copolymer, polyvinyl alcohol and modified polyvinyl alcohol, poly(N-methylol acryl amide), a styrene/vinyl toluene copolymer, chlorosulfonated polyethylene, nitrocellulose, polyvinyl chloride, chlorinated polyolefin, polyester, polyimide, a vinyl acetate/vinyl chloride copolymer, an ethylene/vinyl acetate copolymer, carboxy methyl cellulose, gelatine, polyethylene, polypropylene, and polycarbonate, and a compound such as a silane coupling agent. Preferred examples of the polymer include a water-soluble polymer such as poly(N-methylol acryl amide), carboxy methyl cellulose, gelatine, polyvinyl alcohol and modified polyvinyl alcohol, and among them, the gelatine, and the polyvinyl alcohol and the modified polyvinyl alcohol are preferable, and in particular, the polyvinyl alcohol and the modified polyvinyl alcohol are preferable.

[Adhesive Layer]

In a case where a plurality of cured films are bonded to each other by an adhesive, an adhesive layer is disposed between the cured films. The adhesive layer may be formed of an adhesive.

Examples of the adhesive include a hot melt type adhesive, a thermal curing type adhesive, a photocuring type adhesive, a reaction curing type adhesive, and a pressure sensitive adhesive type adhesive which is not necessary to be cured, from the viewpoint of a curing method, and a compound such as an acrylate-based compound, a urethane-based compound, a urethane acrylate-based compound, an epoxy-based compound, an epoxy acrylate-based compound, a polyolefin-based compound, a modified olefin-based compound, a polypropylene-based compound, an ethylene vinyl alcohol-based compound, a vinyl chloride-based compound, a chloroprene rubber-based compound, a cyanoacrylate-based compound, a polyamide-based compound, a polyimide-based compound, a polystyrene-based compound, and a polyvinyl butyral-based compound can be used as the material of each of the adhesives. The photocuring type adhesive is preferable as the curing method from the viewpoint of workability and productivity, and the acrylate-based compound, the urethane acrylate-based compound, the epoxy acrylate-based compound, and the like are preferably used as the material of the adhesive from the viewpoint of optical transparency and heat resistance.

The film thickness of the adhesive layer is 0.5 to 10 µm, and is preferably 1 to 5 µm. In a case where the adhesive layer is used as a half mirror for displaying a projection image, it is preferable that the adhesive layer is disposed with an even film thickness in order to reduce color unevenness or the like.

[Application of Film]

An Example of the film formed by using the polymerizable composition includes a film formed by immobilizing alignment (for example, horizontal alignment, vertical alignment, hybrid alignment, and the like) of a liquid crystalline phase of a polymerizable composition. In general, such a film has optical anisotropy, and is used as an optical compensation film or the like of a liquid crystal display device or the like.

Another example of the film is a film which includes a layer formed by immobilizing a cholesteric liquid crystalline phase of a polymerizable composition and has selective reflection properties with respect to light in a predetermined wavelength range.

In the cholesteric liquid crystalline phase, liquid crystal molecules are arranged into the shape of a spiral. The layer formed by immobilizing the cholesteric liquid crystalline phase (hereinafter, may be referred to as a "cholesteric liquid crystal layer" or a 'liquid crystal layer") functions as a circularly polarized light selective reflection layer which selectively reflects any one of right circularly polarized light and left circularly polarized light in a selective reflection wavelength range, and transmits the other sense of circularly polarized light. A film including one or two or more cholesteric liquid crystal layers can be used in various applications. In a film including two or more cholesteric liquid crystal layers, the senses of circularly polarized light rays which are reflected on the respective cholesteric liquid crystal layers may be identical to each other or opposite to each other according to the application. In addition, the center wavelengths of the selective reflections of the respective cholesteric liquid crystal layers described below may also be identical to each other or different from each other according to the application.

Furthermore, in the specification, the "sense" of the circularly polarized light indicates whether the circularly polarized light is right circularly polarized light or left circularly polarized light. In the sense of the circularly polarized light, in a case of observing light such that the light propagates towards the front side thereof, a case where a distal end of an electric field vector is rotated in a clockwise direction according to an increase in time is defined as right circularly polarized light, and a case where the distal end of the electric field vector is rotated in a counterclockwise direction is defined as left circularly polarized light. In the specification, the term of "sense" may be used in a twisted direction of a spiral of a cholesteric liquid crystal. In a case where the twisted direction (the sense) of the spiral of the cholesteric liquid crystal is in a right direction, the right circularly polarized light is reflected, and the left circularly polarized light is transmitted, and in a case where the sense is in a left direction, the left circularly polarized light is reflected, and the right circularly polarized light is transmitted.

For example, a film including a cholesteric liquid crystal layer having selective reflection properties in a visible light wavelength range (a wavelength of 400 to 750 nm) can be used as a screen or a half mirror for displaying a projection image. In addition, the film can be used as a color filter or a filter which improves a color purity of display light of a display (for example, refer to JP2003-294948A) by controlling a reflection range.

In addition, the optical film can be used in various applications such as a polarization element, a reflection film, an antireflection film, a view angle compensation film, a holography, and an alignment film, which are constituents of an optical element.

[Member for Displaying Projection Image]

The present inventors have found that in the case where a film including a cholesteric liquid crystal layer exhibiting selective reflection properties is prepared by using the polymerizable composition containing the polymerizable liquid crystal compound represented by Formula (I) and the chiral agent and is used as a member for display a projection image, the film is left to stand under a high humidity condition and defects such as a change in tint and deterioration in luminance occur in a projection image. It is considered that the defects of the projection image are caused for the reason that the polymerizable liquid crystal compound represented by Formula (I) is partially decomposed to cause a change in the cholesteric structure. When the present inventors have used a film prepared by using an oxime compound as a polymerization initiator as described above in the same manner, even after the film is left to stand under a high humidity condition, defects do not occur in the projection image. The polymerizable composition of the present invention is particularly useful for the formation of a film including a cholesteric liquid crystal layer and a change in tint and deterioration in luminance are hardly caused by adopting the composition containing an oxime compound even in the case where the film is used for displaying a projection image.

Hereinafter, an application as a member for displaying a projection image will be described.

At a wavelength where projection light is selectively reflected by the function of the cholesteric liquid crystal layer described above, any one sense of the circularly polarized light is reflected, and thus, a projection image can be formed. The projection image may be an image which is displayed on the surface of the member for displaying a projection image and is viewed in this way, or may be a virtual image that emerges from the front of the member for displaying a projection image in a case of being observed by an observer.

A center wavelength $\lambda$ of the selective reflection described above depends on a pitch P (=a cycle of a spiral) of a spiral structure in a cholesteric liquid crystalline phase, and corresponds to a relationship of $\lambda=n \times P$ with an average refractive index n of the cholesteric liquid crystal layer. Furthermore, here, the center wavelength $\lambda$ of the selective reflection of the cholesteric liquid crystal layer indicates a wavelength in a centroid position of a reflection peak of a circularly polarized light reflection spectrum measured from a normal direction of the cholesteric liquid crystal layer. As apparent from the expression described above, the pitch of the spiral structure is adjusted, and thus, the center wavelength of the selective reflection can be adjusted. That is, an n value and a P value are adjusted, and for example, the center wavelength $\lambda$ is adjusted in order to selectively reflect any one of right circularly polarized light and left circularly polarized light with respect to blue light, and thus, it is possible to set the center wavelength of the selective reflection on appearance to be in a wavelength range of 450 nm to 495 nm. Furthermore, the center wavelength of the selective reflection on appearance indicates the wavelength in the centroid position of the reflection peak of the circularly polarized light reflection spectrum of the cholesteric liquid crystal layer measured from an observation direction at the time of being practically used (at the time of being used as the member for displaying a projection image). The pitch length of the cholesteric liquid crystalline phase depends on the type of chiral agent which is used along with the polymerizable liquid crystal compound, or the addition concentration thereof, and thus, a desired pitch length can be obtained by adjusting the type of chiral agent or the addition concentration thereof. Furthermore, methods described in "Introduction of Liquid Crystal Chemical Experiments" of The Japanese Liquid Crystal Society, published by Sigma Publishing Company in 2007, p. 46, and "Liquid Crystal Handbook" of Editorial Committee of Liquid Crystal Handbook, published by MARUZEN-YUSHODO Company, Limited, p. 196 can be used as a measurement method of the sense of the spiral or the pitch.

A half-width $\Delta\lambda$ (nm) of the selective reflection wavelength range where circularly polarized light selective reflection is exhibited depends on birefringence $\Delta n$ of the liquid crystal compound and the pitch length P described above, and corresponds to a relationship of $\Delta\lambda=\Delta n \times P$. For this reason, the width of the selective reflection wavelength range can be controlled by adjusting $\Delta n$. That is, in the cholesteric liquid crystal layer formed of the composition containing the polymerizable liquid crystal compound having low birefringence of the present invention, it is possible to increase the wavelength selectivity of the selective reflection.

For example, $\Delta\lambda/\lambda$, which is a ratio of the half-width $\Delta\lambda$ of the selective reflection wavelength range to the center wavelength λ of the selective reflection, can be used as an index indicating the wavelength selectivity of the selective reflection. In the film of the present invention, in particular, in the film which is used as the member for displaying a projection image, Δλ/λ is preferably less than or equal to 0.09, and is more preferably less than or equal to 0.07. More specifically, in the cholesteric liquid crystal layer of the film, it is preferable that Δλ/λ satisfies the range described above, and in each of the two or more cholesteric liquid crystal layers of the film including the two or more cholesteric liquid crystal layers, it is preferable that Δλ/λ satisfies the range described above. Furthermore, Δλ's and λ's of the respective layers may be identical to each other or different from each other.

Each cured film having a center wavelength of selective reflection on appearance in each of a red light wavelength range, a green light wavelength range, and a blue light wavelength range is prepared by using the polymerizable composition described above, and the cured films are laminated, and thus, a member for displaying a projection image which can display a full color projection image can be prepared. Specifically, in a half mirror, it is preferable that cured films having different center wavelengths of selective reflections (for example, different by greater than or equal to 50 nm) in each of ranges of 750 to 620 nm, 630 to 500 nm, and 530 to 420 nm are laminated.

The center wavelength of the selective reflection of each of the cured films is adjusted according to a light emission wavelength range of a light source to be used in projection and a use aspect of the member for displaying a projection image, and thus, a clear projection image with excellent light utilization efficiency can be displayed. In particular, each of the center wavelengths of the selective reflections of the cured films is adjusted according to the light emission wavelength range of the light source to be used in the projection, and the like, and thus, a clear color projection image with excellent light utilization efficiency can be displayed. In particular, the use aspect of the member for displaying a projection image includes an incidence angle of projection light on the surface of the half mirror for displaying a projection image, a projection image observation direction on the surface of the member for displaying a projection image, and the like.

For example, the member for displaying a projection image described above is configured to have transmittance with respect to light in a visible light range, and thus, can be used as a half mirror which can be used as a combiner of a head-up display. The half mirror for displaying a projection image can visibly display an image projected from a projector or the like, and simultaneously, when the half mirror for displaying a projection image is observed from the same surface side as the surface on which the image is displayed, information and scenery on the opposite surface side can be observed.

When the member for displaying a projection image is used as a half mirror for displaying a projection image, it is preferable that the cured film prepared as described above, in particular, a laminate of three or more cured films is disposed on a surface of a base material. It is preferable that the base material is transparent and has low birefringence in a visible light range. For example, a phase difference of the base material at a wavelength of 550 nm is preferably less than or equal to 50 nm, and is more preferably less than or equal to 20 nm. Examples of the base material include inorganic glass or a polymer resin (an acrylic resin (acrylic acid esters such as polymethyl (meth)acrylate, and the like), cyclic polyolefin such as polycarbonate, cyclopentadiene-based polyolefin, or norbornene-based polyolefin, polyolefins such as polypropylene, aromatic vinyl polymers such as polystyrene, polyarylate, cellulose acylate, and the like).

The half mirror for displaying a projection image may include an antireflection layer. It is preferable that the antireflection layer is provided on the outermost surface. The antireflection layer may be disposed on the outermost surface which becomes a viewing side at the time of using the half mirror for displaying a projection image, or may be disposed on the outermost surface on the opposite side, and it is preferable that the antireflection layer is disposed on the outermost surface on the viewing side. In a case where the cured film is disposed on the surface of the base material, the antireflection layer may be disposed on both of the surface on the base material side and the surface on the cured film side which becomes the viewing side. According to such a configuration, a double image, which is particularly generated in a case where the birefringence of the base material is high, is rarely generated.

Examples of the antireflection layer include a film having a configuration of a two-layer film in which a layer of high refractive index and a layer of low refractive index are combined, a layer having a configuration of three-layer film in which a layer of intermediate refractive index, a layer of high refractive index, and a layer of low refractive index are sequentially laminated, and the like, in addition to a film in which fine surface concavities and convexities are formed.

Configuration examples include a configuration including two layers of a layer of high refractive index/a layer of low refractive index in this order from a lower side, a configuration including three layers having different refractive indices, in which a layer of intermediate refractive index (a layer having a refractive index which is higher than that of a underlayer and is lower than that of a layer of high refractive index)/a layer of high refractive index/a layer of low refractive index are laminated in this order, and the like, and it is also proposed that more antireflection layers are laminated. Among them, it is preferable that a layer of intermediate refractive index/a layer of high refractive index/a layer of low refractive index are provided on a hard coat layer in this order, from the viewpoint of durability, optical properties, costs, productivity, and the like, and examples of the configuration include configurations described in JP1996-122504A (JP-H08-122504A), JP1996-110401A (JP-H08-110401A), JP1998-300902A (JP-H10-300902A), JP2002-243906A, JP2000-111706A, and the like. In addition, an antireflection film having a three-layer configuration, which has excellent robustness with respect to a variation in a film thickness, is described in JP2008-262187A. In a case where the antireflection film having a three-layer configuration described above is disposed on a surface of an image display device, it is possible to set an average value of reflectivity to be less than or equal to 0.5%, to considerably reduce reflected glare, and to obtain an image having excellent stereoscopic effects. In addition, other functions may be imparted to each layer, and examples of a layer to which other functions are imparted include a layer of low refractive index having antifouling properties, a layer of high refractive index having antistatic properties, a hard coat layer having antistatic properties, and a hard coat layer having anti-glare characteristics (for example, JP1998-206603A (JP-H10-206603A), JP2002-243906A, JP2007-264113A, and the like), and the like.

Examples of an inorganic material configuring the antireflection layer include $SiO_2$, $SiO$, $ZrO_2$, $TiO_2$, $TiO$, $Ti_2O_3$, $Ti_2O_5$, $Al_2O_3$, $Ta_2O_5$, $CeO_2$, $MgO$, $Y_2O_3$, $SnO_2$, $MgF_2$, $WO_3$, and the like, and one type of material can be independently used, or two or more types thereof can be used together. Among them, $SiO_2$, $ZrO_2$, $TiO_2$, and $Ta_2O_5$ are preferable since vacuum vapor deposition can be performed at a low temperature, and thus, a film can also be formed on a surface of a plastic substrate.

A laminated structure of alternately forming a high refractive index material layer and a low refractive index material layer, in which the total optical film thickness of a $ZrO_2$ layer and a $SiO_2$ layer from the substrate side is λ/4, an optical film thickness of the $ZrO_2$ layer is λ/4, and an optical film thickness of the $SiO_2$ layer which is the outermost layer is λ/4, is exemplified as a multilayer film which is formed of the inorganic material. Here, λ is a design wavelength, and a wavelength of 520 nm is generally used. It is preferable that the outermost layer is formed of $SiO_2$ since a refractive index is low, and a mechanical hardness can be imparted to the antireflection layer.

In a case where the antireflection layer is formed of the inorganic material, for example, a vacuum vapor deposition method, an ion plating method, a sputtering method, a CVD method, a method of performing precipitation in a saturated solution by a chemical reaction, and the like can be adopted as a film formation method.

Examples of an organic material which is used in the layer of low refractive index can include a tetrafluoroethylene-hexafluoropropylene copolymer (FFP), polytetrafluoroethylene (PTFE), an ethylene-tetrafluoroethylene copolymer (ETFE), and the like, and a composition containing a fluorine-containing curable resin and inorganic fine particles, which is described in JP2007-298974A, a low refractive index coating composition containing hollow silica fine particles, which is described in JP2002-317152A, JP2003-202406A, and JP2003-292831A can be preferably used. The film formation method can be performed by coating methods such as a spin coating method, a dip coating method, and a gravure coating method, which have excellent productivity, in addition to the vacuum vapor deposition method.

It is preferable that the refractive index of the layer of low refractive index is preferably 1.30 to 1.51. The refractive index of the layer of low refractive index is more preferably 1.30 to 1.46, and is even more preferably 1.32 to 1.38.

Examples of an organic material which is used in the layer of intermediate refractive index and the layer of high refractive index can include a binder which is obtained by cross-linking or a polymerization reaction, such as an ionizing radiation curable compound having an aromatic ring, an ionizing radiation curable compound containing a halogenated element other than fluorine (for example, Br, I, Cl, and the like), and an ionizing radiation curable compound containing an atom such as S, N, and P, and inorganic particles containing $TiO_2$ to be added to the binder as a main component. Specifically, an organic material described in paragraphs [0074] to [0094] of JP2008-262187A can be exemplified.

The refractive index of the layer of high refractive index is preferably 1.65 to 2.20, and is more preferably 1.70 to 1.80. The refractive index of the layer of intermediate refractive index is adjusted to be a value between the refractive index of the layer of low refractive index and the refractive index of the layer of high refractive index. The refractive index of the layer of intermediate refractive index is preferably 1.55 to 1.65, and is more preferably 1.58 to 1.63.

The film thickness of the antireflection layer is not particularly limited, but may be approximately 0.1 to 10 μm, 1 to 5 μm, and 2 to 4 μm.

EXAMPLES

Hereinafter, the characteristics of the present invention will be described in detail with reference to the examples and comparative examples. Materials, use amounts, ratios, treatment contents, treatment sequences, and the like of the following examples can be suitably changed unless the changes cause deviance from the gist of the present invention. Accordingly, the range of the present invention will not be restrictively interpreted by the following specific examples.

<Synthesis of Rod-Like Liquid Crystal Compound 101>

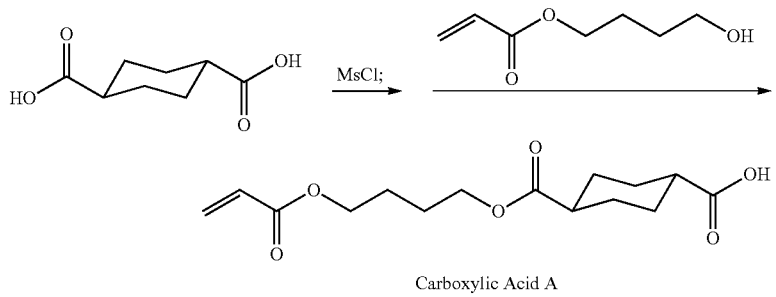

Carboxylic Acid A

A trans-1,4-cyclohexane dicarboxylic acid (10 g), mesyl chloride (1.9 mL), and dibutyl hydroxy toluene (BHT) (0.2 g) were stirred in THF (72 mL), and triethyl amine (3.7 mL) was subjected to dropwise addition by retaining an internal temperature to be lower than or equal to 25° C. Stirring was performed at a room temperature for 2 hours, and then, N,N-dimethyl aminopyridine (0.3 g) and 4-hydroxy butyl acrylate (3.1 g) were added, and triethyl amine (3.7 mL) was subjected to dropwise addition at an internal temperature of lower than or equal to 25° C. Stirring was performed at a room temperature for 3 hours, and then, water (0.5 mL) and methanol (2 mL) were added, and a reaction liquid to which ethyl acetate was added was subjected to Celite filtration, a water layer was removed by adding a dilute hydrochloric acid to a filtrate, and washing was sequentially performed with sodium bicarbonate water and saline. An organic layer was dried with magnesium sulfate, the desiccant was filtered, and then, a solvent was distilled under reduced pressure, and thus, a carboxylic acid A (7.1 g) was obtained.

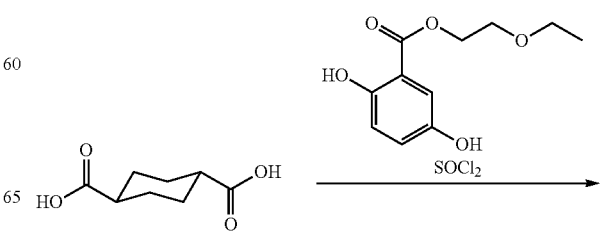

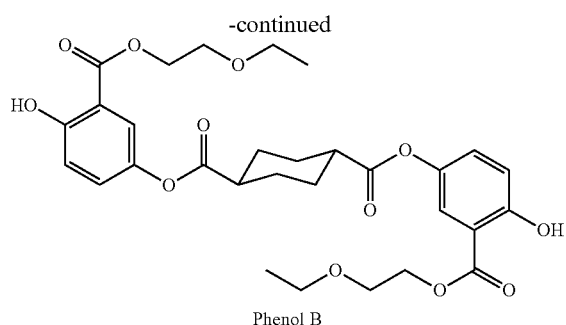

Phenol B

A mixture of a trans-1,4-cyclohexane dicarboxylic acid (5 g), toluene (40 mL), and N,N-dimethyl formamide (0.05 mL) was heated and stirred, thionyl chloride (8.3 g) was subjected to dropwise addition at an internal temperature of 80° C., and then, heating and stirring were performed at an internal temperature 80° C. for 2 hours. Cooling was performed to an internal temperature of 30° C., and then, 2-ethoxy ethyl-2,5-dihydroxy benzoate (13.1 g) was added, and then, heating and stirring were performed at an internal temperature of 90° C. for 4 hours. Methanol (60 mL) was added at an internal temperature of 40° C., and then, stirring was further performed at an internal temperature 5° C. for 30 minutes, and generated crystals were filtered, and thus, 11.5 g of a phenol B was obtained.

$^1$H-NMR (Solvent: CDCl$_3$) δ(ppm):
1.25 (t, 6H), 1.6-1.7 (m, 4H), 2.2-2.4 (m, 4H), 2.5-2.6 (m, 2H), 3.55-3.65 (m, 4H), 3.8-3.85 (m, 4H), 4.45-4.5 (m, 4H), 7.0 (d, 2H), 7.2 (dd, 2H), 7.6 (d, 2H)

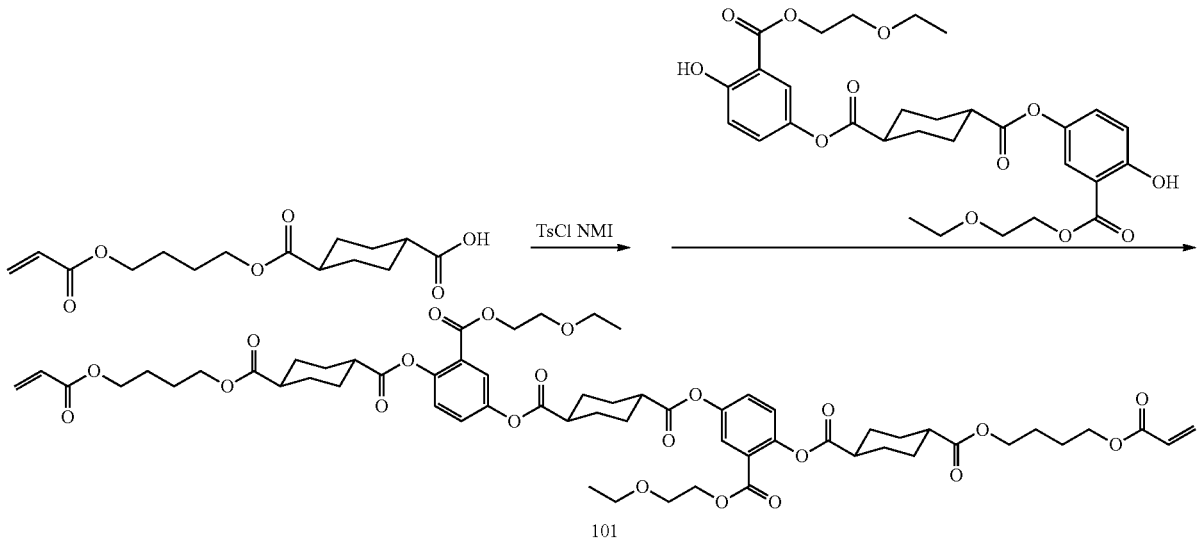

101

The monocarboxylic acid I-9 (13.4 g), TsCl (10.3 g), and BHT (0.2 g) were stirred in THF (40 mL) and 1-ethyl-2-pyrrolidone (25 mL), 1-methyl imidazole (11 mL) was subjected to dropwise addition under ice cooling, and stirring was performed at a room temperature for 1 hour. The phenol derivative (10.6 g) was added, and stirring was further performed at a room temperature for 2 hours. Water (10 mL) was added, and then, a water layer was removed, water and methanol were added, stirring was performed for 1 hour under ice cooling, and generated crystals were filtered, and thus, a compound 101 (18.3 g) was obtained.

$^1$H-NMR (Solvent: CDCl$_3$) δ(ppm):
1.2 (t, 6H), 1.4-1.8 (m, 18H), 2.1-2.2 (m, 4H), 2.2-2.4 (m, 12H), 2.5-2.7 (m, 4H), 3.5 (q, 4H), 3.7-3.8 (m, 4H), 4.1-4.3 (m, 8H), 4.4-4.5 (m, 4H), 5.8 (dd, 2H), 6.1 (dd, 2H), 6.4 (dd, 2H), 7.1 (d, 2H), 7.3 (dd, 2H), 7.7 (d, 2H)

<Synthesis of Rod-Like Liquid Crystal Compound 102>

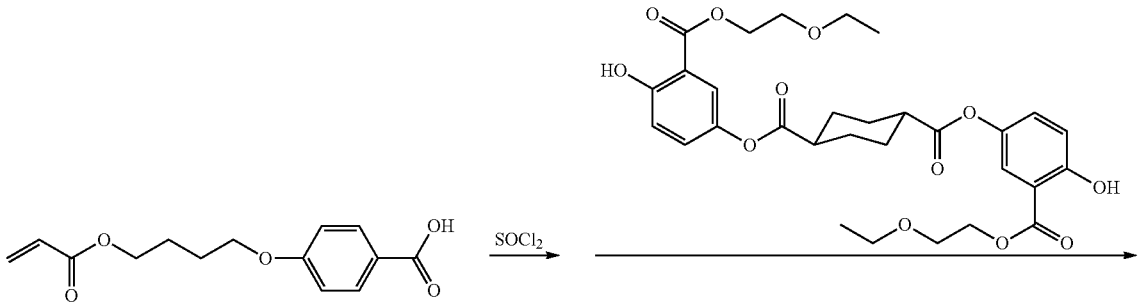

-continued

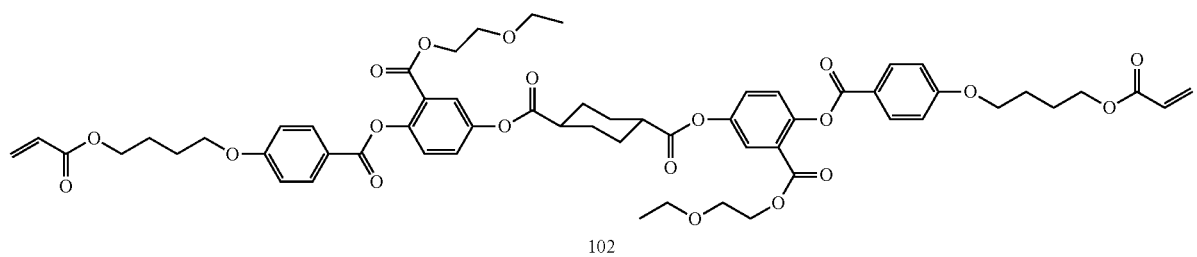

102

A 4-(4-acryloyloxy butyloxy) benzoic acid was synthesized with reference to a method described in [0085] to [0087] on Page 18 of JP4397550B.

BHT (60 mg) was added to a tetrahydrofuran (10 mL) solution of methane sulfonyl chloride (1.62 mL), and an internal temperature was cooled to −5° C. A tetrahydrofuran (8 mL) solution of 4-(4-acryloyloxy butyloxy) benzoic acid (5.5 g) and diisopropyl ethyl amine (3.7 mL), which was separately prepared, was subjected to dropwise addition such that an internal temperature did not become higher than or equal to 0° C. Stirring was performed at −5° C. for 1 hour, and then, a small amount of N-methyl imidazole was added, the phenol B (5.2 g) was added, and 15 mL of tetrahydrofuran was added, and then, triethyl amine (3.1 mL) was subjected to dropwise addition, and after that, stirring was performed at a room temperature for 3 hours. The reaction was stopped by adding water (13 mL), a water layer was removed by adding ethyl acetate, and washing was sequentially performed with a dilute hydrochloric acid and saline. Filtration was performed by adding a desiccant, and then, generated crystals were filtered by adding methanol, and thus, 8.4 g of a rod-like liquid crystal compound 102 was obtained.

$^1$H-NMR (Solvent: $CDCl_3$) δ(ppm):
1.2 (t, 6H), 1.65-1.8 (m, 4H), 1.85-1.95 (m, 8H), 2.3-2.4 (m, 4H), 2.6-2.7 (m, 2H), 3.4 (q, 4H), 3.5-3.6 (m, 4H), 4.1 (m, 4H), 4.15-4.25 (m, 8H), 5.85 (dd, 2H), 6.1 (dd, 2H), 6.4 (dd, 2H), 7.0 (d, 4H), 7.25 (d, 2H), 7.35 (dd, 2H), 7.8 (d, 2H), 8.15 (d, 4H)

<Preparation of Selective Reflection Film>

| (Composition of Polymerizable Composition Coating Liquid (1)) | |
|---|---|
| Rod-like liquid crystal compound 101 | 55 parts by mass |
| Rod-like liquid crystal compound 102 | 30 parts by mass |
| Rod-like liquid crystal compound 201 | 13 parts by mass |
| Rod-like liquid crystal compound 202 | 2 parts by mass |
| Polymerization initiator shown in Table 1 | Added amount shown in Table 1 |
| Chiral agent LC756 (manufactured by BASF SE) | 4 parts by mass |
| Alignment agent (1) | 0.01 parts by mass |
| Alignment agent (2) | 0.02 parts by mass |
| Methyl acetate | 260 parts by mass |
| Cyclohexanone | 65 parts by mass |

Rod-like liquid crystal compound 201

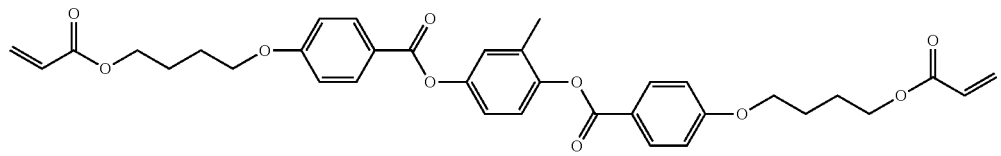 [SMILES: C=CC(=O)OCCCCOc1ccc(C(=O)Oc2ccc(OC(=O)c3ccc(OCCCCOC(=O)C=C)cc3)c(C)c2)cc1]

Rod-like liquid crystal compound 202

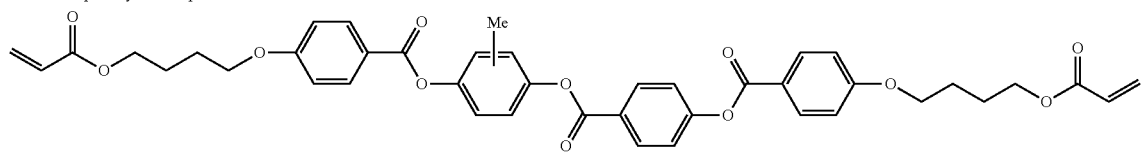

Alignment agent (1)

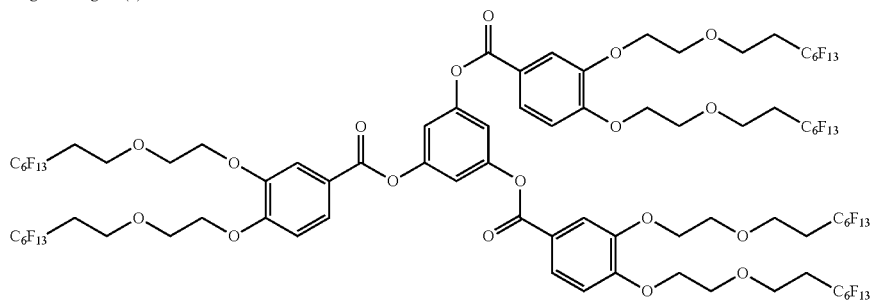

(Composition of Polymerizable Composition Coating Liquid (1))

Alignment agent (2)

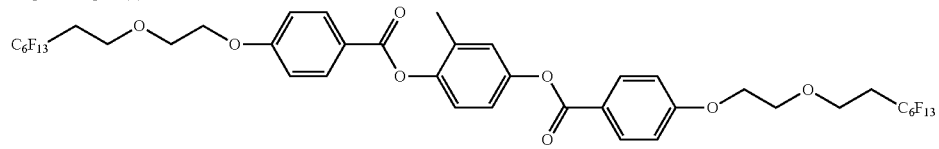

The alignment agents (1) and (2) were synthesized with reference to the method described in JP2012-211306A.

The polymerizable composition coating liquid (1) was applied to a rubbed surface of PET manufactured by Fujifilm Corporation, which had been subjected to a rubbing treatment, at room temperature by using a wire bar such that the thickness of a dried film after being dried became 4.6 km. The coated layer was dried at room temperature for 10 seconds, and then was heated in an atmosphere of 85° C. for 1 minute. Then, UV irradiation was performed at 60° C. and an output of 80% for 8 seconds by using D BULB manufactured by Heraeus Noblelight America LLC (a lamp of 90 mW/cm) to obtain a selective reflection film. The precipitation of the crystal in the coated film was not observed a period from the coating to the heating.

<Evaluation of Selective Reflection Film>

(Alignment)

Superiority in liquid crystal alignment was determined on the basis of the following standards depending on whether or not alignment defects are present when the film was observed with a polarizing microscope. Any of evaluation standards A to C is preferable. In a case of A or B in the evaluation standards, production efficiency is excellent and the film can be suitably used. It is more preferable that the film is evaluated as A in the evaluation standards.

A: No alignment defect exists.

B: Almost no alignment defect exists.

C: Some alignment defects are observed in some regions.

D: Alignment defects exist in whole area.

(Moisture Resistance Test)

A case where in the transmission spectrum of the selective reflection film before and after an environment test at 60° C. and 95% for 100 hours, a decrease in transmittance in a range of 330 nm to 450 nm was less than 5% was evaluated as A and a case where a decrease in transmittance was greater than or equal to 5% was evaluated as B.

The results are shown in Table 1.

TABLE 1

| | Polymerization initiator | Added amount (parts by mass) | Alignment | Moisture resistance test at 60° C. and 95% for 100 hours |
|---|---|---|---|---|
| EXAMPLE 1 | OXE01 | 4 | A | A |
| EXAMPLE 2 | OXE01 | 2 | A | A |
| EXAMPLE 3 | OXE01 | 1 | A | A |
| EXAMPLE 4 | OXE02 | 4 | A | A |
| EXAMPLE 5 | OXE02 | 2 | A | A |
| EXAMPLE 6 | OXE02 | 1 | A | A |
| COMPARATIVE EXAMPLE 1 | Irg819 | 4 | A | B |
| COMPARATIVE EXAMPLE 2 | Irg819 | 2 | A | B |

IRGACURE-OXE01 (manufactured BASF SE)

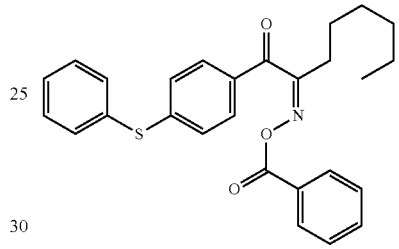

IRGACURE-OXE02 (manufactured BASF SE)

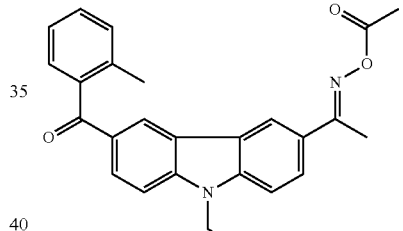

Irg819: IRGACURE819 (manufactured by BASF SE)

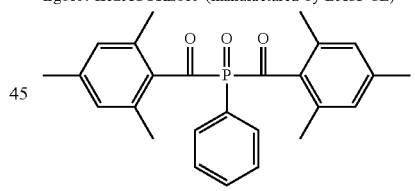

<Preparation of Selective Reflection Film>

Polymerizable Composition Coating Liquid (11)

| | |
|---|---|
| Rod-like liquid crystal compound 101 | 55 parts by mass |
| Rod-like liquid crystal compound 102 | 30 parts by mass |
| Rod-like liquid crystal compound 201 | 13 parts by mass |
| Rod-like liquid crystal compound 202 | 2 parts by mass |
| Polymerization initiator OXE01 (manufactured by BASF SE) | 1 part by mass |
| Chiral agent LC756 (manufactured by BASF SE) | 3.7 parts by mass |
| Alignment agent (2) | 0.01 parts by mass |
| Alignment agent (3) | 0.02 parts by mass |
| Methyl acetate | 260 parts by mass |
| Cyclohexanone | 65 parts by mass |

The polymerizable composition coating liquid (11) was applied to a rubbed surface of PET (A-4100) manufactured by Toyobo Ltd., which had been subjected to a rubbing treatment, at room temperature by using a wire bar such that the thickness of a dried film after being dried became 5.0 m. The coated layer was dried at room temperature for 30 seconds, and then was heated in an atmosphere of 85° C. for 1 minute. Then, UV irradiation was performed at 60° C. in a nitrogen gas atmosphere using a high pressure mercury lamp such that the irradiation dose became 300 mJ/cm². Thus, a selective reflection film 11 was obtained. The precipitation of the crystal in the coated film was not observed a period from the coating to the heating.

As a result of measuring the transmission spectrum of the selective reflection film by using a spectrophotometer UV-3100PC manufactured by SHIMADZU CORPORATION, the center of the selective reflection peak was at 671 nm and the half-width thereof was 40 nm. A ratio ($\Delta\lambda/\lambda$) of a half-width in a selective reflection wavelength range to the center wavelength of selective reflection was 0.059.

Polymerizable composition coating liquids (12) and (13) were prepared in the same manner as the preparation of the polymerizable composition coating liquid (11).

Polymerizable Composition Coating Liquid (12)

| | |
|---|---|
| Rod-like liquid crystal compound 101 | 55 parts by mass |
| Rod-like liquid crystal compound 102 | 30 parts by mass |
| Rod-like liquid crystal compound 201 | 13 parts by mass |
| Rod-like liquid crystal compound 202 | 2 parts by mass |
| Polymerization initiator OXE01 (manufactured by BASF SE) | 1 part by mass |
| Chiral agent LC756 (manufactured by BASF SE) | 4.7 parts by mass |
| Alignment agent (2) | 0.005 parts by mass |
| Alignment agent (3) | 0.01 parts by mass |
| Methyl acetate | 260 parts by mass |
| Cyclohexanone | 65 parts by mass |

Polymerizable Composition Coating Liquid (13)

| | |
|---|---|
| Rod-like liquid crystal compound 101 | 55 parts by mass |
| Rod-like liquid crystal compound 102 | 30 parts by mass |
| Rod-like liquid crystal compound 201 | 13 parts by mass |
| Rod-like liquid crystal compound 202 | 2 parts by mass |
| Polymerization initiator OXE01 (manufactured by BASF SE) | 1 part by mass |
| Chiral agent LC756 (manufactured by BASF SE) | 5.5 parts by mass |
| Alignment agent (2) | 0.005 parts by mass |
| Alignment agent (3) | 0.01 parts by mass |
| Methyl acetate | 260 parts by mass |
| Cyclohexanone | 65 parts by mass |

Subsequently, the polymerizable composition coating liquid (12) was applied onto the surface of the liquid crystal layer of the selective reflection film 11 at room temperature by using a wire bar such that the thickness of a dried film after being dried became 4.1 μm (the total film thickness with the underlayer became 9.2 μm). The coated layer was dried at room temperature for 30 seconds and then was heated in an atmosphere of 85° C. for 1 minute, and UV irradiation was performed at 60° C. in a nitrogen gas atmosphere by using a high pressure mercury lamp such that the irradiation dose became 300 mJ/cm². Thus, a selective reflection film 12 was obtained.

Further, the polymerizable composition coating liquid (13) was applied to the surface of the liquid crystal layer of the selective reflection film 12 at room temperature by using a wire bar such that the thickness of a dried film after being dried became 3.9 μm (the total film thickness with an underlayer became 13.1 μm). The coated layer was dried at room temperature for 30 seconds, and then was heated in an atmosphere of 85° C. for 1 minute, and UV irradiation was performed at 60° C. in a nitrogen gas atmosphere by using a high pressure mercury lamp such that the irradiation dose became 300 mJ/cm². Thus, a selective reflection film 13 was obtained.

As a result of measuring the transmission spectrum of the selective reflection film 13 by using a spectrophotometer UV-3100PC manufactured by SHIMADZU CORPORATION, it was found that the selective reflection peak was at 680 nm, 540 nm, and 459 nm high visible light transmittance of greater than or equal to 75% was obtained.

<Preparation of Half Mirror 1>

A UV curable adhesive Exp. U12034-6 manufactured by DIC CORPORATION was applied onto the selective reflection film 13 on the liquid crystal layer side at a room temperature by using a wire bar such that the thickness of the dried film after being dried became 5 rm. In a state where polarizing plates were arranged to be orthogonal to each other, and the selective reflection film 13 was disposed between the polarizing plates, a surface of a methacrylic transparent base material ("ACRYLITE L", manufactured by Mitsubishi Rayon Co., Ltd.), which had a thickness of 5 mm and had a maximum phase difference of 5 nm in a plane of 10 cm square in which in-plane color unevenness was invisible, and an adhesive coating surface of the selective reflection film 13 were bonded to each other, and were subjected to UV irradiation, and the PET film of the film 10 was peeled off, and thus, a visible light transmissive half mirror for displaying a projection image 1 including an acrylic base material was prepared. A color video image was projected onto the half mirror using a commercially available LCD imager and the image was observed through the half mirror. As a result, a virtual video image without color unevenness could be confirmed.

<Preparation of Half Mirror 2>

Polymerizable Composition Coating Liquid (14)

| | |
|---|---|
| Photocurable Acrylic Polymer (VANARESIN GH1202, manufactured by Shin-Nakamura Chemical Co., Ltd.) | 50 parts by mass |
| BISCOAT 360 (manufactured by Osaka Organic Chemical Industry Ltd.) | 50 parts by mass |
| Polymerization initiator OXE01 (manufactured by BASF SE) | 1 part by mass |
| Alignment agent (2) | 0.01 parts by mass |
| Methyl ethyl ketone | 230 parts by mass |

The polymerizable composition coating liquid (14) was applied to the selective reflection film 13 on the liquid crystal layer side at a room temperature by using a wire bar such that the thickness of the dried film after being dried became 4 μm. The coated layer was dried at room temperature for 30 seconds and then was heated in an atmosphere of 85° C. for 1 minute, and UV irradiation was performed at 30° C. in a nitrogen gas atmosphere by using a high pressure mercury lamp such that the irradiation dose became 300 mJ/cm². Thus, a selective reflection film 14 was obtained.

Next, UVX-5457 (UV curable adhesive) manufactured by TOAGOSEI Co., Ltd. was applied to the selective reflection film 14 on the liquid crystal layer side at a room temperature by using a wire bar such that the thickness of the dried film after being dried became 5 m. The surface of a glass plate having a thickness of 2 mm and the adhesive coated surface of the selective reflection film 14 were bonded to each other and then UV irradiation was performed. The PET film of the selective reflection film 14 was peeled off and thus a visible light transmissive half mirror for displaying a projection image 2 having a glass base material was prepared. A color video image was projected onto the half mirror using a commercially available LCD imager and the image was observed through the half mirror. As a result, a virtual video image without color unevenness could be confirmed.

Water 371 parts by mass

Methanol 119 parts by mass

The coating liquid for an alignment layer was applied to a washed glass substrate and the solvent was dried under the conditions of 100° C. for 2 minutes. A substrate with an alignment film was prepared by performing a rubbing treatment.

(Formation of Optically Anisotropic Layer)

The liquid crystalline composition coating liquid (1) was applied onto a rubbed surface of the prepared substrate with an alignment film at room temperature by a spin coating method to form a liquid crystal layer. The formed liquid crystal layer was once heated on a hot plate until a nematic phase (Ne phase) was obtained, and the cooled to stabilize the alignment at a smectic A phase (SmA phase). Thereafter, the alignment was immobilized by ultraviolet ray irradiation to form an optically anisotropic layer. Thus, optical films of Example 11 and Comparative Example 11 were prepared.

Coating Liquid for Optically Anisotropic Layer 21

| | |
|---|---|
| Compound A-1 below | 20.00 parts by mass |
| Liquid crystal compound L-1 below | 40.00 parts by mass |
| Liquid crystal compound L-2 below | 40.00 parts by mass |
| Polymerization initiator shown in Table 2 | 6.00 parts by mass |
| Leveling agent (Compound T-1 below) | 0.20 parts by mass |
| Cyclopentanone | 423.11 parts by mass |

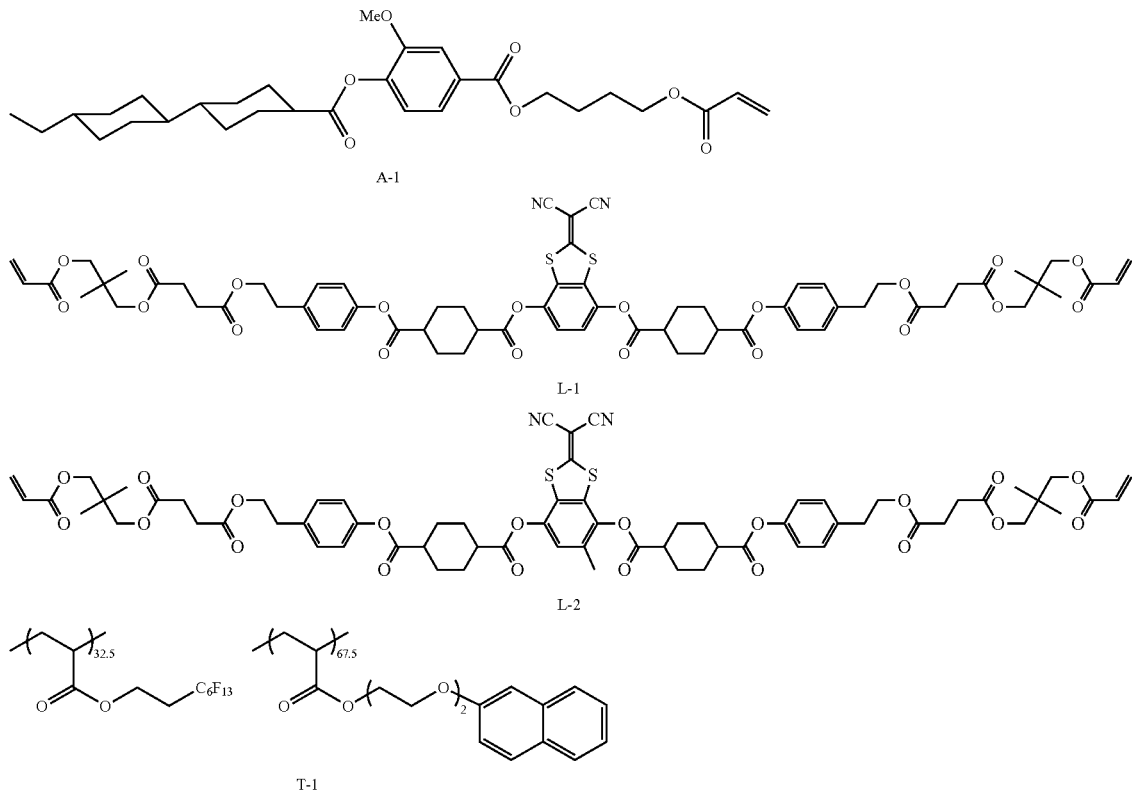

Example 11 and Comparative Example 11

(Formation of Alignment Layer)
Coating Liquid for Alignment Layer
Polyvinyl alcohol PVA 103 (manufactured by Kuraray Co., Ltd.) 11 parts by mass Example 12 and Comparative Example 12

Optical films of Example 12 and Comparative Example 12 were prepared in the same manner as in Example 11 and Comparative Example 11 except that instead of using the coating liquid for an optically anisotropic layer 21 in Example 10, a coating liquid for an optically anisotropic layer 22 having the following composition was used.

Coating Liquid for Optically Anisotropic Layer 22

| | |
|---|---|
| Compound A-1 above | 20.00 parts by mass |
| Liquid crystal compound L-6 below | 80.00 parts by mass |
| Polymerization initiator shown in Table 2 | 6.00 parts by mass |
| Leveling agent (Compound T-1 above) | 0.20 parts by mass |
| Cyclopentanone | 423.11 parts by mass |

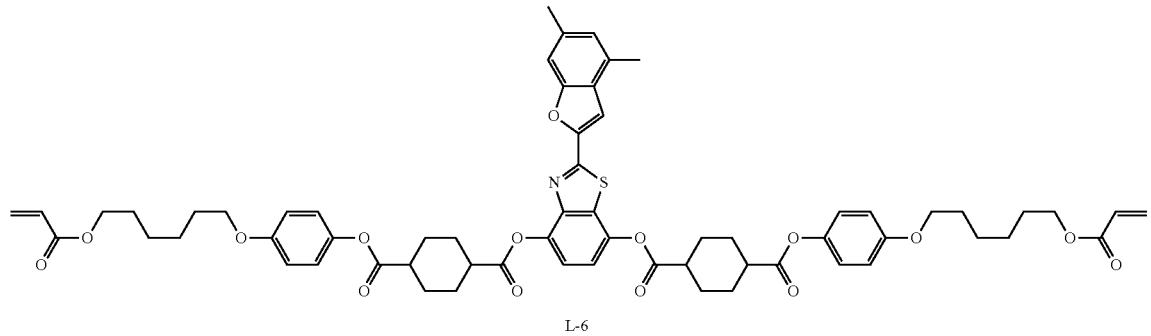 [SMILES: C=CC(=O)OCCCCCCOc1ccc(OC(=O)C2CCC(C(=O)Oc3ccc(OC(=O)C4CCC(C(=O)Oc5ccc(OCCCCCCOC(=O)C=C)cc5)CC4)c4sc(-c5cc6c(C)cc(C)cc6o5)nc34)CC2)cc1]

L-6

<Evaluation of Optical Film>

(Alignment)

The optical film prepared in each of Examples and Comparative Examples described above was observed in a state in which the optically anisotropic layer was shifted by 2° from an extinction position with a polarizing microscope and was evaluated based on the following standards. The results are shown in Table 1 below.

A: The liquid crystal director is precisely adjusted and aligned and the display performance is very excellent.

B: The liquid crystal director is adjusted and aligned and the display performance is excellent.

C: The liquid crystal director is slightly adjusted and aligned.

D: The liquid crystal director is aligned in a disorderly manner and the display performance is deteriorated.

E: The liquid crystal director is significantly disordered to make the surface condition unstable and the display performance is significantly deteriorated.

(Moisture Resistance Test)

A case where in the transmission spectrum of the optical film before and after an environment test at 60° C. and 95% for 100 hours, a decrease in transmittance in a range of 330 nm to 450 nm was less than 5% was evaluated as A and a case where a decrease in transmittance was greater than or equal to 5% was evaluated as B.

The results are shown in Table 2.

TABLE 2

| | Polymerization initiator | Alignment | Moisture resistance test at 60° C. and 95% for 100 hours |
|---|---|---|---|
| EXAMPLE 11 | OXE01 | A | A |
| EXAMPLE 12 | OXE01 | A | A |
| COMPARATIVE EXAMPLE 11 | IRG819 | B | B |
| COMPARATIVE EXAMPLE 12 | IRG819 | B | B |

What is claimed is:

1. A polymerizable composition, comprising:
a polymerizable liquid crystal compound represented by Formula (I); and
an oxime compound,

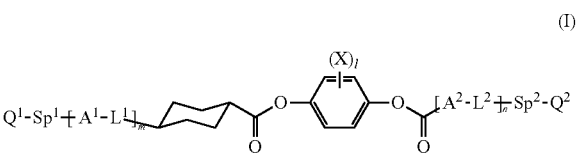

in the formula, $A^1$ and $A^2$ each independently represent a phenylene group which may have a substituent or a trans-1,4-cyclohexylene group which may have a substituent, $L^1$ and $L^2$ each independently represent a single bond or a linking group selected from the group consisting of —CH$_2$O—, —OCH$_2$—, —(CH$_2$)$_2$OC(=O)—, —C(=O)O(CH$_2$)$_2$—, —C(=O)O—, —OC(=O)—, —OC(=O)O—, —CH=CH—C(=O)O—, and —OC(=O)—CH=CH—, $Sp^1$ and $Sp^2$ each independently represent a single bond or a linking group selected from the group consisting of a linear alkylene group or a branched alkylene group having 1 to 20 carbon atoms, and a group in which one or two or more —CH$_2$—'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, $Q^1$ and $Q^2$ each independently represent a hydrogen atom or a polymerizable group selected from the group consisting of groups represented by Formula Q-1 to Formula Q-5 and at least one of $Q^1$ and $Q^2$ represents a polymerizable group,

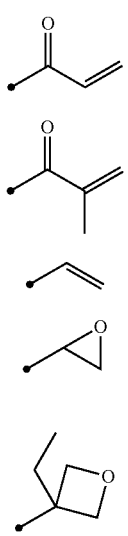

Q-1
Q-2
Q-3
Q-4
Q-5 m and n each independently represent an integer of 0 to 2, when m represents 2, two $A^1$'s may be identical to each other or different from each other, and two $L^1$'s may be identical to each other or different from each other, and when n represents 2, two $A^2$'s may be identical to each other or different from each other, and two $L^2$'s may be identical to each other or different from each other, X may represent a group represented by —$X^3$—$Sp^3$-$Q^3$ or two X's may be bonded to each other to form a fused ring with a benzene ring of a phenylene group to which two X's are bonded, wherein the fused ring is selected from the group consisting of naphthalene, chroman, isochroman, indoline, isoindoline, chromene, xanthene, phenoxathiin, thianthrene, quinoline, isoquinoline, phthalazine, quinoxaline, 1,3-benzodithiol-2-ylidene, and 1,3-benzothiazol-2-yl, and the fused ring may have a substituent, $X^3$ represents a single bond, or a linking group selected from the group consisting of —O—, —C(=O), and —C(=O)O—, $Sp^3$ represents a single bond or a linking group selected from the group consisting of a linear alkylene group or a branched alkylene group having 1 to 20 carbon atoms, and a group in which one or two or more —CH$_2$-'s in the linear alkylene group or the branched alkylene group having 1 to 20 carbon atoms are substituted with —O—, —S—, —NH—, —N(CH$_3$)—, —C(=O)—, —OC(=O)—, or —C(=O)O—, $Q^3$ represents a hydrogen atom or any polymerizable group selected from the group consisting of a cycloalkyl group, a group in which one or two or more —CH$_2$-'s in the cycloalkyl group are substituted with —O—, —S—, —NH—, —N(CH$_3$)—, —C(=O)—, —OC(=O)—, or —C(=O)O—, and groups represented by Formula Q-1 to Formula Q-5, and l represents an integer of 0 to 4, and when l represents 2 to 4, l X's may be identical to each other or different from each other.

2. The polymerizable composition according to claim 1, wherein the polymerizable liquid crystal compound is a polymerizable liquid crystal compound in which in Formula (I), the phenylene group substituted with X is represented by Formula (IV) or Formula (V),

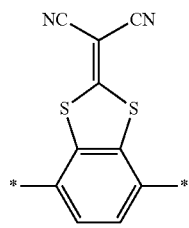
(IV)

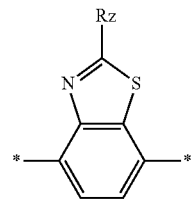
(V)

in Formula (IV) and Formula (V), * represents a bonding position with the remaining portion of the compound represented by Formula (I), and in Formula (V), Rz represents an alkyl group, an aryl group which may have a substituent, or a heteroaryl group which may have a substituent.

3. The polymerizable composition according to claim 1, wherein the polymerizable liquid crystal compound is a polymerizable liquid crystal compound in which in Formula (I), X represents a group represented by —X-$Sp^3$-$Q^3$, $X^3$ represents —C(=O)O—, and l represents 1.

4. The polymerizable composition according to claim 3, wherein the polymerizable liquid crystal compound is a polymerizable liquid crystal compound in which in Formula (I), $A^1$ and $A^2$ each independently represent a 1,4-phenylene group which may have a substituent, m represents 1 or 2, and n represents 0 or 1.

5. The polymerizable composition according to claim 3, wherein the polymerizable liquid crystal compound is a polymerizable liquid crystal compound in which in Formula (I), both $A^1$ and $A^2$ represent an unsubstituted trans-1,4-cyclohexylene group, m represents 0 or 1, and n represents 1 or 2.

6. The polymerizable composition according to claim 1, wherein the polymerizable liquid crystal compound is a polymerizable liquid crystal compound represented by Formula (I-21), (I-21)

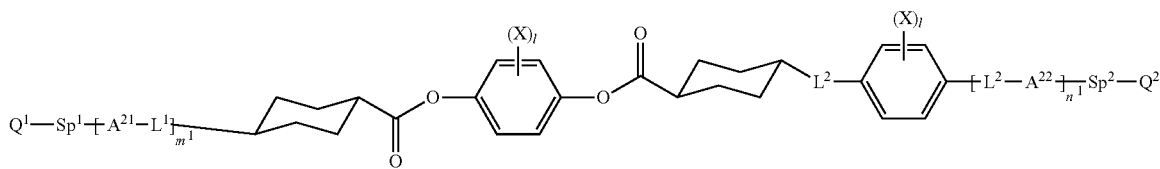

in the formula, $A^{21}$ represents a 1,4-phenylene group which may have a substituent, $A^{22}$ represents an unsubstituted trans-1,4-cyclohexylene group, $m^1$ represents an integer of 0 to 1, and $n^1$ represents an integer of 0 to 1.

7. The polymerizable composition according to claim 1, wherein the polymerizable liquid crystal compound is a compound represented by Formula (I-12), (I-12)

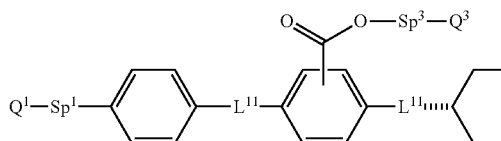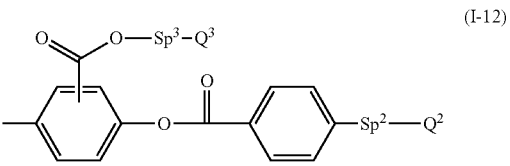

in the formula, $L^{11}$'s each independently represent a single bond, or a linking group selected from the group consisting of —C(=O)O—, —OC(=O)—, and —OC(=O)O—.

8. The polymerizable composition according to claim 1, wherein the polymerizable liquid crystal compound is a compound represented by Formula (I-22), (I-22)

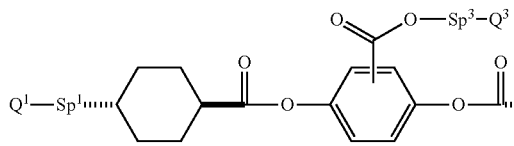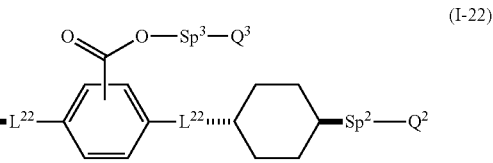

in the formula, $L^{22}$'s each independently represents a single bond or a linking group selected from the group consisting of —C(=O)O—, —OC(=O)—, and —OC(=O)O—.

9. The polymerizable composition according to claim 1, wherein the polymerizable liquid crystal compound is a polymerizable liquid crystal compound in which in Formula (I), m+n is greater than or equal to 2.

10. The polymerizable composition according to claim 2, wherein the polymerizable liquid crystal compound is a polymerizable liquid crystal compound in which in Formula (I), $A^1$ represents a 1,4-phenylene group which may have a substituent, m represents 1, n represents 2, and $A^2$ represents an unsubstituted trans-1,4-cyclohexylene group, and a 1,4-phenylene group which may have a substituent in this order from $Q^1$ side.

11. The polymerizable composition according to claim 10, wherein the polymerizable liquid crystal compound is a polymerizable liquid crystal compound in which, in Formula (I), the phenylene group substituted with X is represented by Formula (IV).

12. The polymerizable composition according to claim 10, wherein the polymerizable liquid crystal compound is a polymerizable liquid crystal compound in which, in Formula (I), the phenylene group substituted with X is represented by Formula (V).

13. The polymerizable composition according to claim 1, further comprising:
a chiral compound.

14. The polymerizable composition according to claim 1, further comprising:
a cross-linking agent.

15. A film, comprising:
a layer obtained by curing the polymerizable composition according to claim 1.

16. A film, comprising:
two or more layers obtained by curing the polymerizable composition according to claim 1.

17. The film according to claim 15, wherein the film reflects visible light.

18. A film, comprising:
at least three layers formed of the polymerizable composition according to claim 1,
wherein the three layers are a layer formed by immobilizing a cholesteric liquid crystalline phase having a center wavelength of selective reflection in a red light wavelength range, a layer formed by immobilizing a cholesteric liquid crystalline phase having a center wavelength of selective reflection in a green light wavelength range, and a layer formed by immobilizing a cholesteric liquid crystalline phase having a center wavelength of selective reflection in a blue light wavelength range.

19. A half mirror for displaying a projection image, comprising:
the film according to claim 18.

20. The half mirror for displaying a projection image according to claim 19, further comprising:
a base material which is inorganic glass or an acrylic resin.

* * * * *